(12) United States Patent
Adachi et al.

(10) Patent No.: US 10,877,803 B2
(45) Date of Patent: Dec. 29, 2020

(54) CONTROL APPARATUS, CONTROL METHOD AND NON-TRANSITORY STORAGE MEDIUM

(71) Applicant: OMRON Corporation, Kyoto (JP)

(72) Inventors: Yasuhiro Adachi, Otsu (JP); Yoshihide Nishiyama, Yokohama (JP); Shigeyuki Eguchi, Joyo (JP)

(73) Assignee: OMRON Corporation, Kyoto (JP)

( * ) Notice: Subject to any disclaimer, the term of this patent is extended or adjusted under 35 U.S.C. 154(b) by 127 days.

(21) Appl. No.: 16/221,589

(22) Filed: Dec. 17, 2018

(65) Prior Publication Data

US 2019/0272197 A1   Sep. 5, 2019

(30) Foreign Application Priority Data

Mar. 5, 2018 (JP) .................................. 2018-038665

(51) Int. Cl.
*G06F 9/48* (2006.01)
*G06F 9/54* (2006.01)
*G05B 19/05* (2006.01)

(52) U.S. Cl.
CPC ......... *G06F 9/4887* (2013.01); *G05B 19/056* (2013.01); *G06F 9/485* (2013.01); *G06F 9/4818* (2013.01); *G06F 9/542* (2013.01); *G05B 2219/15079* (2013.01); *G05B 2219/25343* (2013.01)

(58) Field of Classification Search
CPC .................. G05B 19/05; G05B 19/056; G05B 2219/13063; G06F 2209/523; G06F 9/54; G06F 9/4887; G06F 9/4818; G06F 9/542
See application file for complete search history.

(56) References Cited

U.S. PATENT DOCUMENTS

| 2012/0239172 A1* | 9/2012 | Nishiyama | G05B 19/05 700/86 |
| 2014/0005805 A1* | 1/2014 | Nishiyama | G05B 19/05 700/74 |
| 2014/0088767 A1* | 3/2014 | Shimamura | G05B 19/056 700/275 |

FOREIGN PATENT DOCUMENTS

| EP | 2525266 | 11/2012 |
| EP | 2672341 | 12/2013 |
| EP | 2672346 | 12/2013 |

(Continued)

OTHER PUBLICATIONS

"Search Report of Europe Counterpart Application", dated Sep. 20, 2019, pp. 1-10.

*Primary Examiner* — Dong U Kim
(74) *Attorney, Agent, or Firm* — JCIPRNET

(57) ABSTRACT

Provided is a system capable of appropriately evaluating even an execution state of a program having a relatively low priority in execution of a plurality of programs having different priorities in a control apparatus. The control apparatus includes a first program which is repeatedly executed by the processor and has a highest execution priority, a second program and a third program, and a scheduler program which manages programs executed by the processor. The scheduler program includes a command for causing the processor to execute the second and third programs such that execution of the first program is not obstructed, and a command for determining an execution state of the second program in each predetermined monitoring cycle on the basis of a start notification and an end notification from the second program.

14 Claims, 14 Drawing Sheets

(56) References Cited

FOREIGN PATENT DOCUMENTS

| EP | 2672384 | 12/2013 |
|----|---------|---------|
| JP | 2012194662 | 10/2012 |

\* cited by examiner

CONTROL APPARATUS, CONTROL METHOD AND NON-TRANSITORY STORAGE MEDIUM

CROSS-REFERENCE TO RELATED APPLICATION

This application claims the priority of Japan patent application serial no. 2018-038665, filed on Mar. 5, 2018. The entirety of the above-mentioned patent application is hereby incorporated by reference herein and made a part of this specification.

BACKGROUND

Technical Field

The present technology relates to a control method pertaining to execution of programs in a control apparatus which executes a plurality of programs having different priorities.

Description of Related Art

Factory automation (FA) technology using a control apparatus such as a programmable logic controller (PLC) is widely used in various production fields. With the recent development of information communication technology (ICT), various application programs as well as conventional sequence programs have also been executed in such a control apparatus in the FA field.

For example, Japanese Unexamined Patent Application, First Publication No. 2012-194662 (Patent Document 1) discloses a configuration in which a user program and a motion computation processor are repeatedly executed at a first user program execution cycle.

PATENT DOCUMENTS

[Patent Document 1] Japanese Unexamined Patent Application, First Publication No. 2012-194662.

In Japanese Unexamined Patent Application, First Publication No. 2012-194662 (Patent Document 1), user programs are classified into high-priority user programs which are repeatedly executed using a motion control cycle and low-priority user programs which are repeatedly executed using an integer multiple of the motion control cycle (as an example, another process P, another process Q and another process R). In this manner, a low-priority user program may include a plurality of programs and these programs may be executed in a predetermined order.

However, with the increase in speed and computing power in programs executed as low-priority user programs, a new problem that a specific process among a plurality of processes included in a low-priority user program may take a long time to be executed and thus sufficient time to execute the remaining processes may not be able to be secured may occur.

SUMMARY

According to an example of the disclosure, a control apparatus for controlling a control object is provided. The control apparatus includes a processor, a first program which is repeatedly executed by the processor and has a highest execution priority, a second program having a lower execution priority than the first program, a third program having a lower execution priority than the second program, and a scheduler program which manages programs executed by the processor. The second program includes a notification command for outputting a start notification according to start of execution in the processor and outputting an end notification according to completion of execution in the processor. The scheduler program includes a command for causing the processor to execute the second and third programs such that execution of the first program is not obstructed, and a command for determining an execution state of the second program in each predetermined monitoring cycle on the basis of the start notification and the end notification from the second program.

According to another example of the disclosure, a non-transitory storage medium storing a system program executed in a control apparatus having a processor for controlling a control object may be provided. The system program may include a first program which is repeatedly executed by the processor and have a highest execution priority, a second program having a lower execution priority than the first program, and a third program having a lower execution priority than the second program. The second program may include a notification command for outputting a start notification according to start of execution in the processor and outputting an end notification according to completion of execution in the processor. The system program may include a scheduler program which manages programs executed by the processor. The scheduler program may include a command for causing the processor to execute the second and third programs such that execution of the first program is not obstructed, and a command for determining an execution state of the second program in each predetermined monitoring cycle on the basis of the start notification and the end notification from the second program.

According to another example of the disclosure, a control method of a control apparatus having a processor for controlling a control object is provided. The control apparatus includes a first program which is repeatedly executed by the processor and has a highest execution priority, a second program having a lower execution priority than the first program and a third program having a lower execution priority than the second program. The second program includes a notification command for outputting a start notification according to start of execution in the processor and outputting an end notification according to completion of execution in the processor. The control method includes a step of causing the processor to execute the second and third programs such that execution of the first program is not obstructed and a step of determining an execution state of the second program in each predetermined monitoring cycle on the basis of the start notification and the end notification from the second program.

DESCRIPTION OF THE EMBODIMENTS

Figure 1:
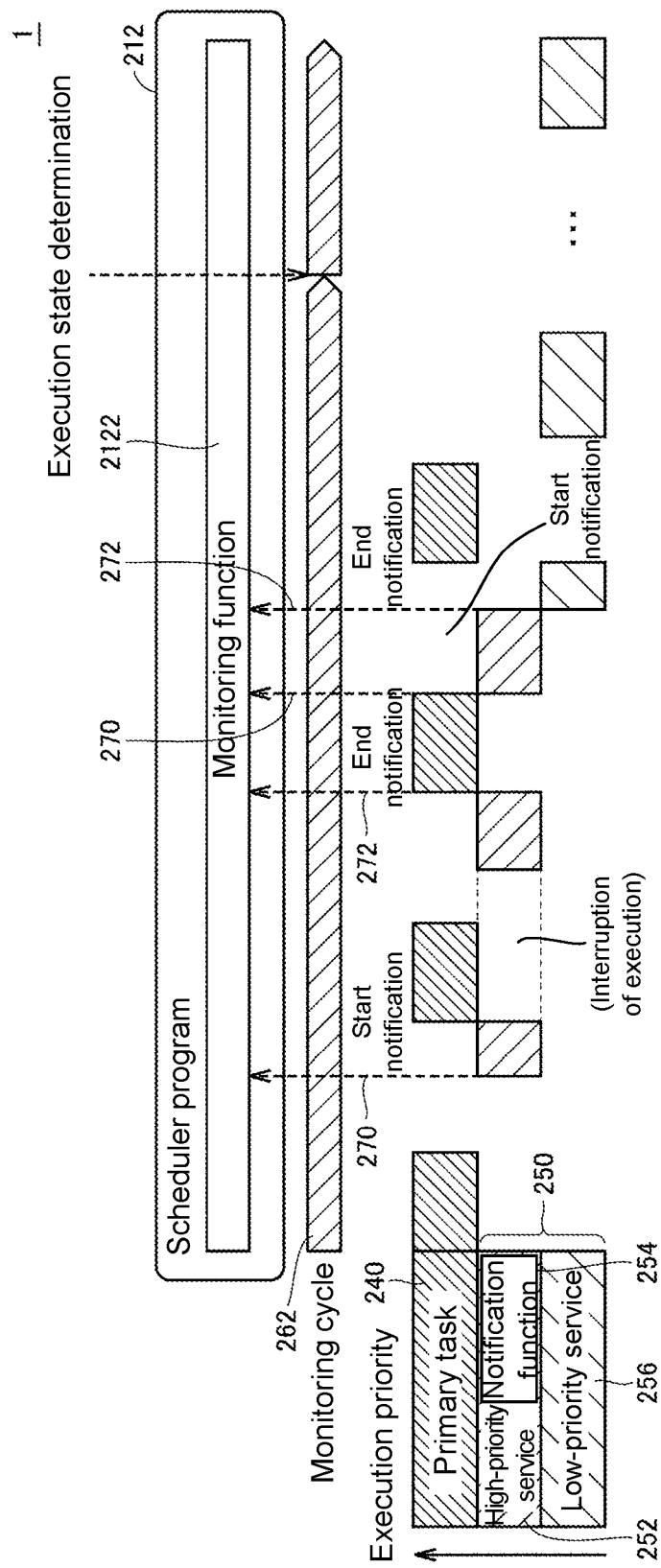
FIG. 1 is a schematic diagram showing an example of program execution in a control apparatus according to the present embodiment.

Herein provides a system capable of appropriately evaluating an execution state of a program having a relatively low priority in execution of a plurality of programs having different priorities in a control apparatus.

According to an example of the disclosure, a control apparatus for controlling a control object is provided. The control apparatus includes a processor, a first program which is repeatedly executed by the processor and has a highest execution priority, a second program having a lower execution priority than the first program, a third program having a lower execution priority than the second program, and a scheduler program which manages programs executed by the processor. The second program includes a notification command for outputting a start notification according to start of execution in the processor and outputting an end notification according to completion of execution in the processor. The scheduler program includes a command for causing the processor to execute the second and third programs such that execution of the first program is not obstructed, and a command for determining an execution state of the second program in each predetermined monitoring cycle on the basis of the start notification and the end notification from the second program.

According to an example of this disclosure, since the scheduler program can determine an execution state of the second program on the basis of the start notification and the end notification from the second program, a state in which a large amount of computing resources has been allocated to the first program and the second program cannot be appropriately executed can be appropriately recognized.

In the above-described disclosure, the control apparatus may further include a fourth program having a higher execution priority than the second program. The scheduler program includes a command for temporarily interrupting execution of the fourth program when the execution state of the second program does not satisfy predetermined settings.

According to an example of this disclosure, when it is determined that the second program cannot be appropriately executed, it is possible to allocate a larger amount of computing resources to the second program by temporarily interrupting execution of the fourth program.

In the above-described disclosure, the command for determining the execution state includes a command for determining an execution state of the third program in the monitoring cycle. The scheduler program includes a command for temporarily interrupting execution of the second program when the execution state of the third program does not satisfy predetermined settings.

According to an example of this disclosure, when it is determined that the third program cannot be appropriately executed, it is possible to allocate a larger amount of computing resources to the third program by temporarily interrupting execution of the second program.

In the above-described disclosure, the notification command may be integrated into the second program using an application programming interface (API).

According to an example of this disclosure, implementation in which a common library is called using an API can be achieved and thus the functions according to the present embodiment can be easily implemented for the second program.

In the above-described disclosure, the scheduler program may repeatedly execute the first program in each predetermined control cycle.

According to an example of this disclosure, the functions according to the present embodiment can be applied to environments in which fixed-time interval execution is performed. In the above-described disclosure, the scheduler program may execute the second program and the third program in idle time in which the first program is not being executed.

According to an example of this disclosure, the functions according to the present embodiment can be applied in environments in which the first program is executed at fixed time intervals and the second program and the third program are executed to an extent possible.

In the above-described disclosure, the command for determining the execution state may include a command for calculating a proportion of the operation time of the second program in the monitoring cycle.

According to an example of this disclosure, it is possible to determine whether a predetermined target operation time is provided with respect to the second program in each monitoring cycle.

In the above-described disclosure, the command for determining the execution state may further include a command for calculating a proportion of the operation time of the third program in a second monitoring cycle longer than the monitoring cycle.

According to an example of this disclosure, it is possible to determine whether a predetermined target operation time is provided with respect to the third program in each second monitoring cycle.

According to another example of the disclosure, a non-transitory storage medium storing a system program executed in a control apparatus having a processor for controlling a control object may be provided. The control apparatus may include a first program which is repeatedly executed by the processor and have a highest execution priority, a second program having a lower execution priority than the first program, and a third program having a lower execution priority than the second program. The second program may include a notification command for outputting a start notification according to start of execution in the processor and outputting an end notification according to completion of execution in the processor. The system program may include a scheduler program which manages programs executed by the processor. The scheduler program may include a command for causing the processor to execute the second and third programs such that execution of the first program is not obstructed, and a command for determining an execution state of the second program in each predetermined monitoring cycle on the basis of the start notification and the end notification from the second program.

According to an example of this disclosure, since the scheduler program can determine the execution state of the second program on the basis of the start notification and the end notification from the second program, it is possible to appropriately recognize a state in which a large amount of computing resources has been allocated to the first program and the second program cannot be appropriately executed, and the like.

According to another example of the disclosure, a control method of a control apparatus having a processor for controlling a control object is provided. The control apparatus includes a first program which is repeatedly executed by the processor and has a highest execution priority, a second program having a lower execution priority than the first program and a third program having a lower execution priority than the second program. The second program includes a notification command for outputting a start notification according to start of execution in the processor and outputting an end notification according to completion of execution in the processor. The control method includes a step of causing the processor to execute the second and third programs such that execution of the first program is not obstructed and a step of determining an execution state of the second program in each predetermined monitoring cycle on the basis of the start notification and the end notification from the second program.

According to an example of this disclosure, since the execution state of the second program can be determined on the basis of the start notification and the end notification from the second program, it is possible to appropriately recognize a state in which a large amount of computing resources has been allocated to the first program and the second program cannot be appropriately executed, and the like.

According to an example of the disclosure, an execution state of a program having a relatively low priority can also be appropriately evaluated when a control apparatus executes a plurality of programs having different priorities.

Embodiments of the disclosure will be described in detail with reference to the drawings. Meanwhile, the same or corresponding parts in the figures are denoted by the same reference signs and description thereof will not be repeated.

A. Example of Application

First, an example of a situation to which the disclosure is applied will be described.

FIG. 1 is a schematic diagram showing an example of program execution in a control apparatus 1 according to the present embodiment. Referring to FIG. 1, the control apparatus 1 is a computer for controlling any control object and has one or more processors.

FIG. 1 shows an example in which a primary task 240 and a system service task 250 are sequentially executed in the control apparatus 1. In the present description, the term "task" is a base unit which is a control object to which computing resources are allocated, and one or more programs to be executed are registered or set for each task. That is, computing resources are allocated to any task and, when the task enters a state in which it can be executed, execution of one or more programs registered or set for the task is started or resumed.

The primary task 240 includes a program having a highest execution priority (hereinafter simply referred to as "priority") executed by a processor of the control apparatus 1. For example, it may include an input/output data update process (hereinafter referred to as "IO refresh"), a sequence computation process to be executed with highest priority, and the like. When the primary task 240 is executed at fixed time intervals, a time required to complete processing of the primary task 240 is guaranteed such that the time becomes equal to or shorter than the duration of a cycle executed at fixed time intervals.

On the other hand, the system service task 250 has a lower priority than the primary task 240 and includes one or more programs. In the present embodiment, the system service task 250 includes a plurality of programs having different priorities. More specifically, the system service task 250 includes a high-priority service 252 and a low-priority service 256. The high-priority service 252 includes a program having a lower priority than the program included in the primary task 240 and the low-priority service 256 includes a program having a lower priority than the program included in the high-priority service 252.

Execution timings of such tasks (programs included therein) are managed by an execution management function (hereinafter referred to as a "scheduler") realized by a scheduler program 212 executed by a processor. That is, the control apparatus 1 includes the scheduler program 212 for managing programs executed by the processor.

The scheduler program 212 repeatedly executes a program included in the primary task 240 and causes the processor to execute programs (programs registered in the high-priority service 252 and the low-priority service 256) included in the system service task 250 such that execution of the program included in the primary task 240 is not obstructed. It is possible to realize management of execution of programs according to the scheduler program 212 by allocating computing resources to each program using suitable times and time intervals.

Here, since the system service task 250 is executed using computing resources other than computing resources used to execute the primary task 240, an execution cycle therefor is not guaranteed and the system service task 250 is executed using computing resources available during execution.

The control apparatus 1 according to the present embodiment also provides a method of realizing a certain degree of execution time management for the system service task 250. Specifically, a notification function 254 is implemented in a program included in the high-priority service 252, and the notification function 254 outputs a start notification 270 in response to start of execution of the corresponding program of the high-priority service 252 in the processor and outputs an end notification 272 in response to end of execution in the processor. The notification function 254 can be realized through a method such as incorporating necessary command code into a corresponding program.

The scheduler program 212 has a monitoring function 2122 for monitoring a program execution state in each predetermined monitoring cycle 262. The monitoring function 2122 may be realized using command code included in the scheduler program 212.

The monitoring function 2122 determines an execution state of the corresponding program (program included in the high-priority service 252) in each monitoring cycle 262 on the basis of the start notification 270 and the end notification 272 from the notification function 254 of the program included in the high-priority service 252. Execution states may include presence or absence of operation of a corresponding program, an operation time proportion in each monitoring cycle 262, and the like.

In the control apparatus 1 according to the present embodiment, it is possible to control appropriate allocation of computing resources, and the like even for a program included in the system service task 250, in which an operation time and the like cannot be guaranteed in conventional methods, by using the monitoring function 2122 shown in FIG. 1.

B. Configuration of Control System

First, a configuration of a control system SYS according to the present embodiment will be described.

Figure 2:
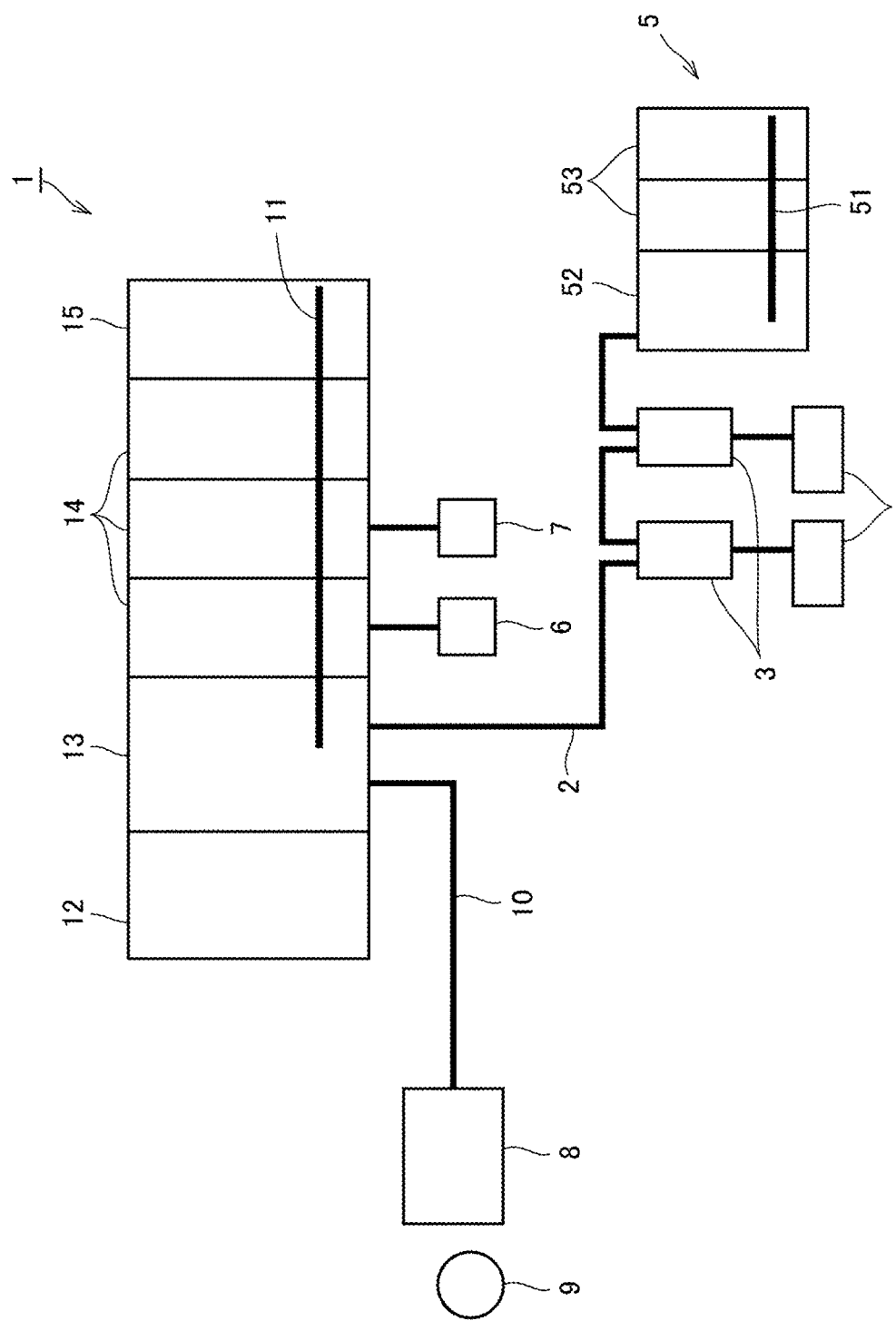
FIG. 2 is a schematic diagram showing a configuration example of a control system according to the present embodiment.

FIG. 2 is a schematic diagram showing a configuration example of the control system SYS according to the present embodiment. Referring to FIG. 2, the control system SYS includes the control apparatus 1, a servo motor driver 3 and a remote IO terminal 5 connected to the control apparatus 1 through a field network 2, a detection switch 6 and a relay 7 which are field devices. A support device 8 is connected to the control apparatus 1 through a connection cable 10 or the like.

The control apparatus 1 includes a computation unit 13 which performs a principal computation process, one or more IO units 14, and a special unit 15. These units are configured to be able to exchange data through a PLC system bus 11. These units are provided with power of an appropriate voltage from a power supply unit 12.

The IO unit 14 is a unit pertaining to a general input/output process and inputs/outputs binary data such as on/off. Specifically, the IO unit 14 collects information representing either of a state (on) in which a sensor such as the detection switch 6 detects an object and a state (off) in which a sensor does not detect an object. In addition, the IO unit 14 may output either of an instruction (on) for enabling and an instruction (off) for disabling for an output destination such as the relay 7 and an actuator.

The special unit 15 has functions which are not supported by the IO unit 14, such as input/output of analog data, temperature control and communication according to a specific communication method.

The field network 2 transmits various types of data exchanged with the computation unit 13. For the field network 2, various types of industrial Ethernet (registered trademark) can be typically used. As the industrial Ethernet (registered trademark), for example, EtherCAT (registered trademark), Profinet IRT, MECHATROLINK (registered trademark)-III, Powerlink, SERCOS (registered trademark)-III, CIPMotion and the like are known, and any thereof can be employed. Further, field networks other than an industrial Ethernet (registered trademark) may be used. For example, in cases in which motion control is not performed, DeviceNet, CompoNet/IP (registered trademark) and the like may be used.

Although FIG. 2 illustrates the control apparatus 1 including both the PLC system bus 11 and the field network 2, a system configuration having only one thereof may be employed.

The servo motor driver 3 is connected to the computation unit 13 through the field network 2 and drives a servo motor 4 according to an instruction value from the computation unit 13. Specifically, the servo motor driver 3 receives instruction values such as a position instruction value, a speed instruction value and a torque instruction value from the control apparatus 1 at fixed time intervals. In addition, the servo motor driver 3 acquires actual measurement values pertaining to the operation of the servo motor 4, such as a position, a speed and a torque, from detectors such as a position sensor (rotary encoder) and a torque sensor connected to the shaft of the servo motor 4 and adjusts a current for driving the servo motor 4. Meanwhile, the servo motor driver 3 may be called a servo motor amplifier.

The remote IO terminal 5 is further connected to the field network 2 of the control system SYS shown in FIG. 2. The remote IO terminal 5 basically performs a process pertaining to general input/output processing like the IO unit 14. More specifically, the remote IO terminal 5 includes a communication coupler 52 for performing processes pertaining to data transmission through the field network 2 and one or more IO units 53. These units are configured to be able to exchange data through a remote IO terminal bus 51.

C. Hardware Configuration of Computation Unit

Figure 3:
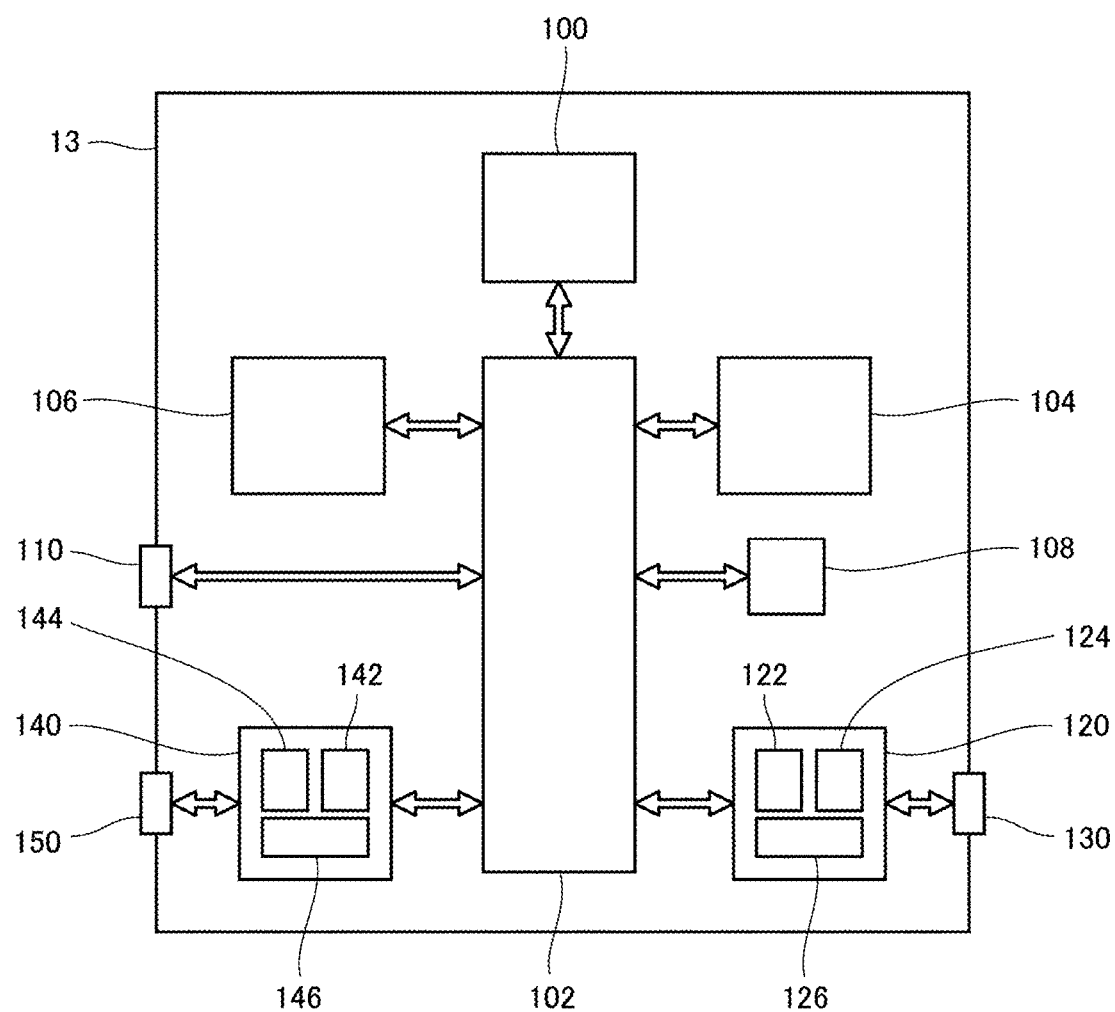
FIG. 3 is a schematic diagram showing an example of a hardware configuration of a computation unit constituting the control apparatus according to the present embodiment.

Next, a hardware configuration of the computation unit 13 constituting the control apparatus 1 shown in FIG. 2 will be described. FIG. 3 is a schematic diagram showing an example of the hardware configuration of the computation unit 13 constituting the control apparatus 1 according to the present embodiment.

Referring to FIG. 3, the computation unit 13 includes a processor 100, a chipset 102, a main memory 104, a nonvolatile memory 106, a system timer 108, a PLC system bus controller 120, a field network controller 140, and a USB connector 110. The chip set 102 is connected to other components through various buses.

Typically, the processor 100 and the chipset 102 are configured according to general computer architecture. That is, the processor 100 interprets and executes command code sequentially supplied from the chipset 102 according to internal clocks. The chipset 102 exchanges internal data with various components connected thereto and generates command code necessary for the processor 100. Further, the chipset 102 has a function of caching data and the like obtained as a result of execution of computation processes in the processor 100.

Although FIG. 3 illustrates one processor 100 for convenience of description, a plurality of processors 100 may be provided or a plurality of cores may be mounted in one processor 100. The performance and configuration of the processor 100 may be determined according to required computing resources.

The computation unit 13 has the main memory 104 and the nonvolatile memory 106 as storage means.

The main memory 104 is a volatile storage area (RAM) and stores various programs to be executed in the processor 100 after supply of power to the computation unit 13. In addition, the main memory 104 is also used as a working memory when the processor 100 executes various programs. For the main memory 104, devices such as a dynamic random access memory (DRAM) and a static random access memory (SRAM) may be used.

The nonvolatile memory 106 stores data such as a real-time operating system (OS), a system program of the control apparatus 1, a user program and system setting parameters in a nonvolatile manner. Such programs and data are copied to the main memory 104 such that the processor 100 can access them as necessary. A semiconductor memory such as a flash memory can be used for the nonvolatile memory 106. Alternatively, a magnetic recording medium such as a hard disk drive, and the like may be used.

The system timer 108 generates an interrupt signal at each fixed time interval and provides the interrupt signal to the processor 100. Although the system timer 108 is typically configured to generate interrupt signals at a plurality of different time intervals according to hardware specifications, it may be set to generate an interrupt signal at an arbitrary time interval according to the operation system (OS), basic input/output system (BIOS) and the like. A control operation in each control cycle as will be described later is realized using the interrupt signal generated by the system timer 108.

The computation unit 13 has the PLC system bus controller 120 and the field network controller 140 as communication circuits. These communication circuits transmit output data such as arbitrary instruction values and receive input data such as detected values obtained from an arbitrary sensor.

The PLC system bus controller 120 controls exchange of data through the PLC system bus 11. More specifically, the PLC system bus controller 120 includes a dynamic memory access (DMA) control circuit 122, a PLC system bus control circuit 124 and a buffer memory 126. The PLC system bus controller 120 is internally connected to the PLC system bus 11 through a PLC system bus connector 130.

The buffer memory 126 serves as a transmission buffer for data (output data) output to other units through the PLC system bus 11 and a reception buffer for data (input data) input from other units through the PLC system bus 11. The DMA control circuit 122 performs forwarding of output data from the main memory 104 to the buffer memory 126 and forwarding of input data from the buffer memory 126 to the main memory 104. The PLC system bus control circuit 124 performs a process of transmitting output data of the buffer memory 126 and a process of receiving input data and storing the input data in the buffer memory 126 with respect to other units connected to the PLC system bus 11.

The field network controller 140 controls exchange of data through the field network 2. That is, the field network controller 140 control transmission of output data and reception of input data according to the standards of the used field network 2. More specifically, the field network controller 140 includes a DMA control circuit 142, a field network control circuit 144 and a buffer memory 146.

The buffer memory 146 serves as a transmission buffer for data (output data) output to other devices and the like through the field network 2 and a reception buffer for data (input data) input from other devices and the like through the field network 2. The DMA control circuit 142 performs forwarding of output data from the main memory 104 to the buffer memory 146 and forwarding of input data from the buffer memory 146 to the main memory 104. The field network control circuit 144 performs a process of transmitting output data of the buffer memory 146 and a process of receiving input data and storing the input data in the buffer memory 146 with respect to other devices connected to the field network 2.

The USB connector 110 is an interface for connecting the support device 8 and the computation unit 13. Typically, programs and the like which are executable in the processor 100 of the computation unit 13 and forwarded from the support device 8 are input to the control apparatus 1 through the USB connector 110.

D. Software Configuration of Computation Unit

Figure 4:
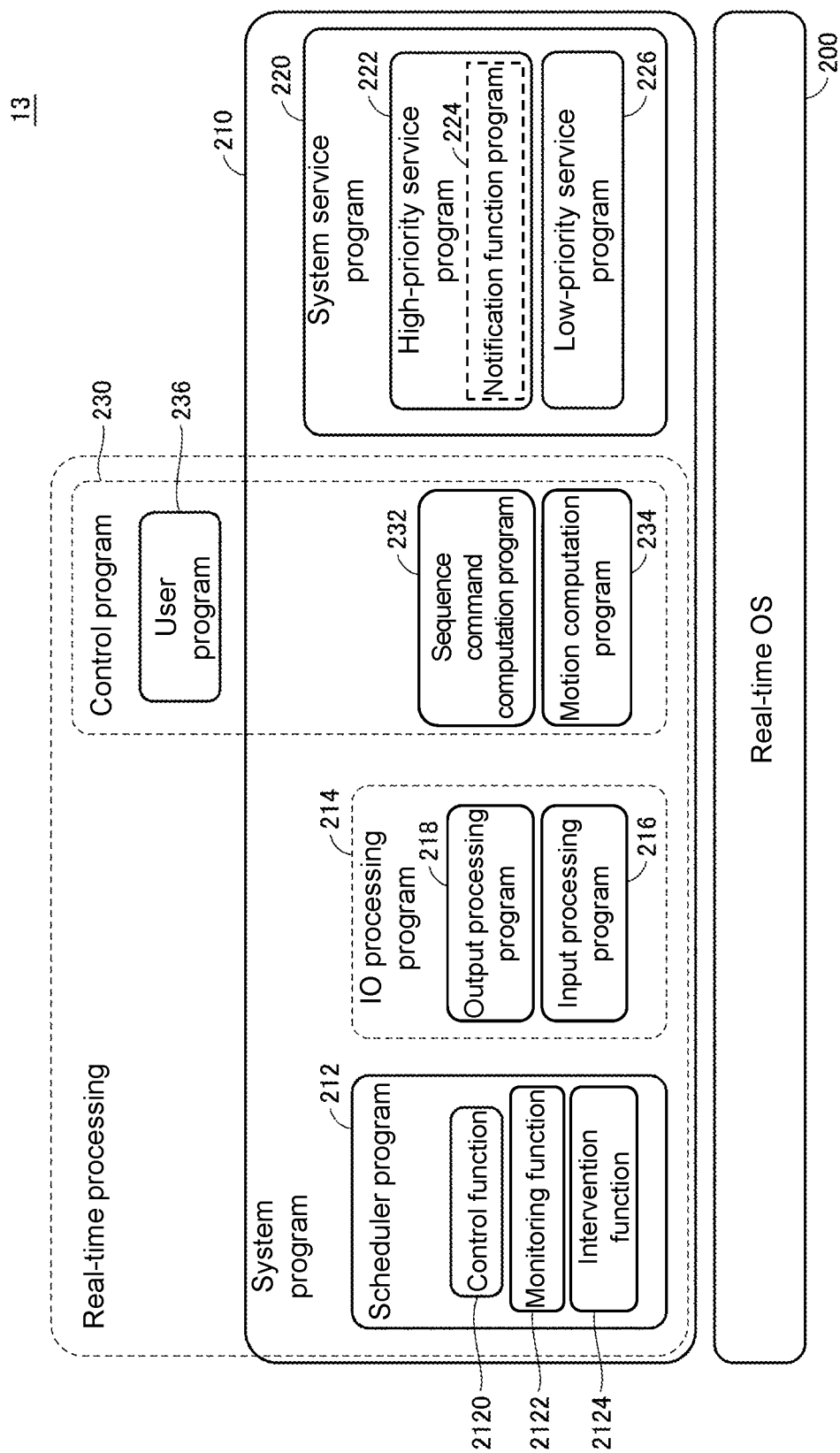
FIG. 4 is a schematic diagram showing an example of a software configuration of the computation unit constituting the control apparatus according to the present embodiment.

Next, a software configuration of the computation unit 13 constituting the control apparatus 1 shown in FIG. 2 will be described. FIG. 4 is a schematic diagram showing an example of the software configuration of the computation unit 13 constituting the control apparatus 1 according to the present embodiment. FIG. 4 shows an example of software groups for providing various functions according to the present embodiment. Command code included in these software groups is read at appropriate timing and executed by the processor 100 of the computation unit 13.

Referring to FIG. 4, software executed by the computation unit 13 is basically composed of three layers of a real-time OS 200, a system program 210 and a user program 236. Meanwhile, if virtualization technology is applied, a plurality of OSs can share the same hardware resources and thus a hypervisor layer is added when such a configuration is employed. The real-time OS 200 is designed according to the computer architecture of the computation unit 13 and provides a basic execution environment for the processor 100 to execute the system program 210 and the user program 236. The real-time OS is typically provided by a control apparatus maker or a specialized software company and the like.

The system program 210 is a software group for providing functions for the control apparatus 1. Specifically, the system program 210 includes a scheduler program 212, an IO processing program 214 (including an input processing program 216 and an output processing program 218), a sequence command computation program 232, a motion computation program 234 and a system service program 220.

The user program 236 is created for a control purpose of a user. That is, it is a program arbitrarily created depending on a control object to be controlled using the control system SYS.

The user program 236 is composed of command code such as a sequence command and a motion command. Typically, the user program 236 has an object program format executable by the processor 100 of the computation unit 13. The user program 236 is created by compiling a source program written in ladder language and the like in the support device 8 and the like. In addition, the generated user program 236 in the object program format is transmitted from the support device 8 to the computation unit 13 through the connection cable 10 and stored in the nonvolatile memory 106 or the like.

The sequence command computation program 232 is a program which is called when a certain type of sequence command used in the user program 236 is executed and executed to realize the content of the command. The motion computation program 234 is a program which is executed by an instruction according to the user program 236 to calculate instruction values to be output to motor drivers such as servo motor driver 3 and a pulse motor driver.

The sequence command computation program 232 and the motion computation program 234 provide commands, functions and functional modules and the like. The user program 236 is executed by the processor 100 of the computation unit 13 to cooperate with the sequence command computation program 232 and the motion computation program 234 to realize a control purpose designated by the user.

In this manner, the user program 236, the sequence command computation program 232 and the motion computation program 234 realize a control purpose in conjunction with one another, and thus these programs may be generally called a control program 230.

The system service program 220 shows program groups for realizing various functions of the control apparatus 1 other than the programs individually shown in FIG. 4. For example, a program which realizes a process of transmitting/receiving files and data to/from external devices (i.e., a program pertaining to a communication process), a program which realizes an abnormality monitoring process, various analysis processes and the like, and the like may be conceived as the system service program 220.

In the computation unit 13 according to the present embodiment, priorities of programs included in the system service program 220 are divided into at least two levels. In FIG. 4, the system service program 220 includes a high-priority service program 222 and a low-priority service program 226 as an example. The high-priority service program 222 has a higher priority than that of the low-priority service program 226.

The scheduler program 212 causes the processor 100 to execute a program included in each task according to a priority set for each task. That is, the scheduler program 212 controls start of processing and resumption of processing after suspension of processing in each execution cycle with respect to the IO processing program 214, the control program 230 and the system service program 220.

Specifically, the scheduler program 212 includes a control function 2120, a monitoring function 2122, and an intervention function 2124. The control function 2120 performs control for allocating computing resources to each process. The monitoring function 2122 monitors an execution state of each program included in the system service program 220. The monitoring function 2122 ascertains an execution state of each program on the basis of a notification of a notification function program 224 of the high-priority service program 222 included in the system service program 220, and the like.

When it is determined that execution of processes pertaining to one or more services included in the system service program 220 is being obstructed on the basis of a monitoring result of the monitoring function 2122, the intervention function 2124 intervenes in execution of a process which is obstructing execution of processes pertaining to the services. That is, the intervention function 2124 temporarily interrupts a process pertaining to a service which is taking a relatively longer time than a process pertaining to another service and secures time to execute a process pertaining to the other service.

In the computation unit 13 according to the present embodiment, an execution time of each program included in the aforementioned system service program 220 is managed by the monitoring function 2122 and the intervention function 2124 included in the scheduler program 212. Management of an execution time of each program included in the system service program 220 will be described in detail later.

The IO processing program 214 performs a process of updating data (input data and output data) available in the computation unit 13. The input processing program 216 of the IO processing program 214 rearranges input data received by the PLC system bus controller 120 and/or the field network controller 140 into a format suitable to be used by the control program 230.

The output processing program 218 rearranges output data generated according to execution of the user program 236 (control program 230) into a format suitable to be forwarded to the PLC system bus controller 120 and/or the field network controller 140. When the PLC system bus controller 120 or the field network controller 140 require an instruction for executing transmission from the processor 100, the output processing program 218 issues such an instruction.

Meanwhile, a part or all of the functions and processes which will be described later which the processor 100 realizes by executing the programs shown in FIG. 4 may be realized using a hard-wired circuit such as an application specific integrated circuit (ASCI) or a field-programmable gate array (FPGA).

E. Processing According to Priority

Next, an example of processing according to priority in the computation unit 13 according to the present embodiment will be described.

Figure 5:
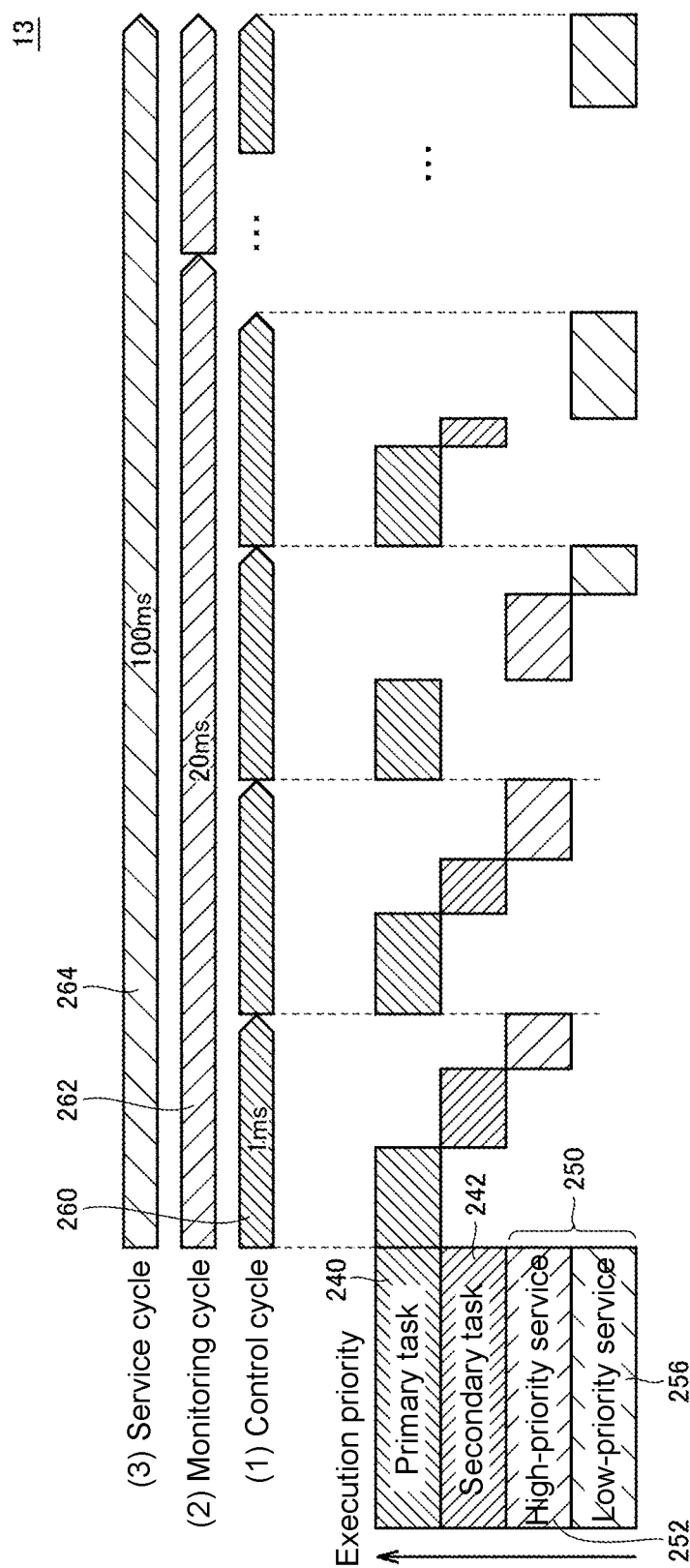
FIG. 5 is a schematic diagram showing an example of processing according to the priority in the computation unit according to the present embodiment.

FIG. 5 is a schematic diagram showing an example of processing according to priority in the computation unit 13 according to the present embodiment. Referring to FIG. 5, in the computation unit 13, the system service task 250 for which an execution cycle is not necessarily guaranteed is executed in addition to the primary task 240 and the secondary task 242 for which execution cycles are guaranteed. That is, FIG. 5 shows a configuration in which at least the primary task 240 is executed at fixed time intervals.

In realization of such fixed time interval execution, computing resources which can be provided by the processor 100 are allocated to the primary task 240 first and then allocated to the secondary task 242. In addition, the remaining computing resources are allocated to the system service task 250. Meanwhile, allocation of computing resources is managed by a scheduler provided by the scheduler program 212.

All or some of the IO processing program 214 (FIG. 4) and the user program 236 (FIG. 4) are registered in the primary task 240 and a corresponding process is executed in each predetermined control cycle. The control cycle 260 is a shortest period managed in the computation unit 13 and is set in a range of several hundred μS (microseconds) to several ms (milliseconds). FIG. 5 shows an example in which the control cycle 260 is 1 ms. That is, the execution cycle of the primary task 240 coincides with the control cycle 260 and all programs included in the primary task 240 are executed in each control cycle 260.

On the other hand, although the priority of the secondary task 242 is set to be lower than the priority of the primary task 240 and the execution cycle thereof is guaranteed, the execution cycle time is generally a multiple of the control cycle 260. For example, when the execution cycle time of the primary task 240 is set to four times the control cycle 260, a program included in the secondary tack 242 is executed once in four control cycles 260.

In addition, a program with a relatively low requirement for execution at fixed time intervals may be registered in the system service task 250. In the processing example shown in FIG. 5, the system service task 250 includes the high-priority service 252 and the low-priority service 256. The priority of the low-priority service 256 is lower than the priority of the high-priority service 252.

For example, when a plurality of tasks to which different priorities are set are executed in parallel using the single-core processor 100, as shown in FIG. 5, the scheduler program 212 repeatedly executes a program included in the primary task 240 in each predetermined control cycle 260. In addition, the scheduler program 212 executes the secondary task 242 and the system service task 250 (the high-priority service 252 and the low-priority service 256) in idle time in which the program included in the primary task 240 is not executed.

As processes included in the high-priority service 252, a process of calculating an instruction value for a robot in a case in which the robot is controlled according to an instruction from the control apparatus 1, a process of generating data for simulation of visualizing a control operation in the control apparatus 1, and the like may be conceived. With respect to processes included in the high-priority service 252, there is a requirement for completing execution of the processes in each execution cycle (sufficiently longer than the control cycle 260).

As processes included in the low-priority service 256, a process of generating data for performing screen update of a human machine interface (HMI), a process of transmitting data from the control apparatus 1 to a database, and the like may be conceived. With respect to processes included in the low-priority service 256, there is requirement for allocating computing resources for a predetermined time in an arbitrary service cycle 264 (sufficiently longer than the control cycle 260).

The monitoring cycle 262 is assumed in addition to the service cycle 264 in the present embodiment in consideration of such requirements of the high-priority service 252 and the low-priority service 256 included in the system service task 250.

FIG. 5 shows an example in which the monitoring cycle 262 is set to 20 ms (20 times the control cycle 260) and the service cycle 264 is set to 100 ms (100 times the control cycle 260). The length of the monitoring cycle 262 may be determined on the basis of a period in which a result of execution of a program registered in the high-priority service 252 will be updated, and the like, for example. The length of the service cycle 264 may be determined on the basis of required response time performance of the HMI, and the like, for example.

In the computation unit 13 according to the present embodiment, computing resources are controlled to be allocated to the high-priority service 252 in each monitoring cycle 262 and computing resources are controlled to be allocated to the low-priority service 256 in a predetermined time ratio in each service cycle 264. In this manner, the computation unit 13 according to the present embodiment has a function of managing allocation of computing resources to the system service task 250.

F. Function of Managing Allocation of Computing Resources to System Service

Next, the function of managing allocating computing resources to the system service task 250 in the computation unit 13 according to the present embodiment will be described.

Figure 6:
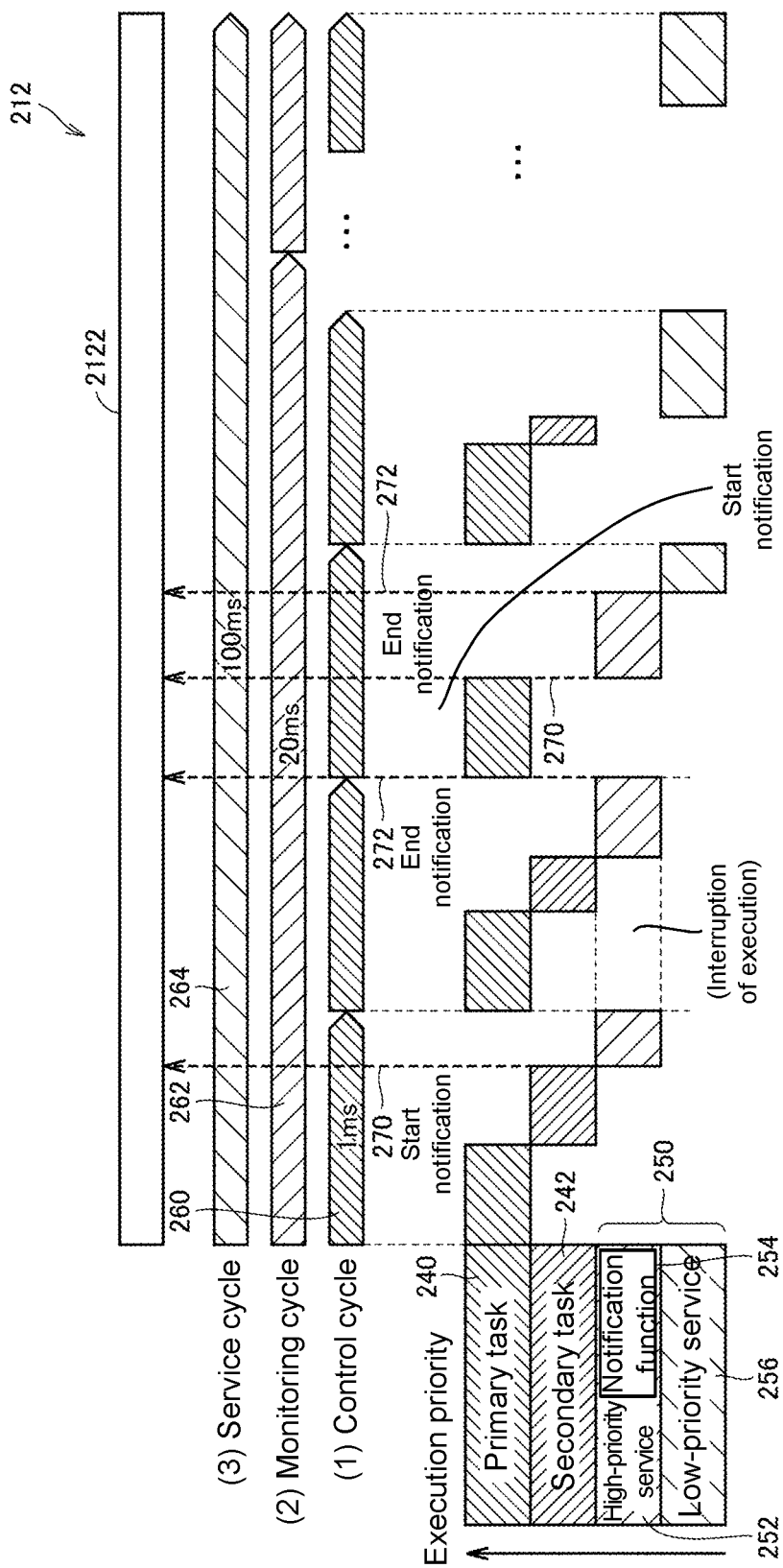
FIG. 6 is a diagram for explaining a notification function and a monitoring function in the computation unit according to the present embodiment.

FIG. 6 is a diagram for explaining the notification function 254 and the monitoring function 2122 in the computation unit 13 according to the present embodiment. Referring to FIG. 6, the high-priority service 252 has the notification function 254, notifies the monitoring function 2122 of start of execution of a process included in the high-priority service 252 (start notification 270) and notifies the monitoring function 2122 of end of the process when the process ends (end notification 272). In this manner, the notification function 254 of the high-priority service 252 notifies the monitoring function 2122 of start and end of a process thereof.

Since a plurality of processes (i.e., a plurality of notification functions 254) may be provided in the high-priority service 252, identification information for identifying each process may be integrated into the start notification 270 and/or the end notification 272.

An application program interface (API) for realizing the notification function 254 may be realized by being integrated into a process included in the high-priority service 252 which is a monitoring object of computing resource allocation. That is, command code for realizing the notification function 254 may be integrated into the notification function program 224 of the high-priority service program 222 using an API. Alternatively, command code for realizing the notification function 254 may be directly embedded in command code of a process included in the high-priority service 252.

The monitoring function 2122 is implemented as a part of the scheduler program 212 or an additional function of the scheduler program 212 and monitors an execution state of the high-priority service 252 on the basis of the start notification 270 and the end notification 272 from the notification function 254. Since the scheduler program 212 manages execution states of the primary task 240 and the secondary task 242, the monitoring function 2122 can calculate an execution time of each of the control process (the primary task 240 and the secondary task 242), the high-priority service 252 and the low-priority service 256. Based on such calculated execution time, the monitoring function 2122 can monitor whether the system service task 250 (the high-priority service 252 and the low-priority service 256) can be operated in a predetermined proportion of time.

More specifically, the monitoring function 2122 can monitor how long the proportion of time in which the high-priority service 252 can operate is within the period of the monitoring cycle 262. In FIG. 6, the monitoring function 2122 monitors what proportion of the high-priority service 252 can operate in each monitoring cycle 262 (20 ms). Similarly, the monitoring function 2122 can monitor how long the proportion of time in which the low-priority service 256 can operate is within the period of the arbitrary service cycle 264. In FIG. 6, the monitoring function 2122 monitors what proportion of the low-priority service 256 can operate in each service cycle 264 (100 ms).

In this manner, the monitoring function 2122 may calculate operation time proportions of programs included in the high-priority service 252 in the monitoring cycle 262. Likewise, the monitoring function 2122 may calculate operation time proportions of programs included in the low-priority service 256 in the service cycle 264 which is another monitoring cycle longer than the monitoring cycle 262.

Meanwhile, a specific example of an execution state monitored by the monitoring function 2122 is not limited to the above-described operation time proportions and may be presence or absence of operations of the high-priority service 252 and/or the low-priority service 256.

Figure 7:
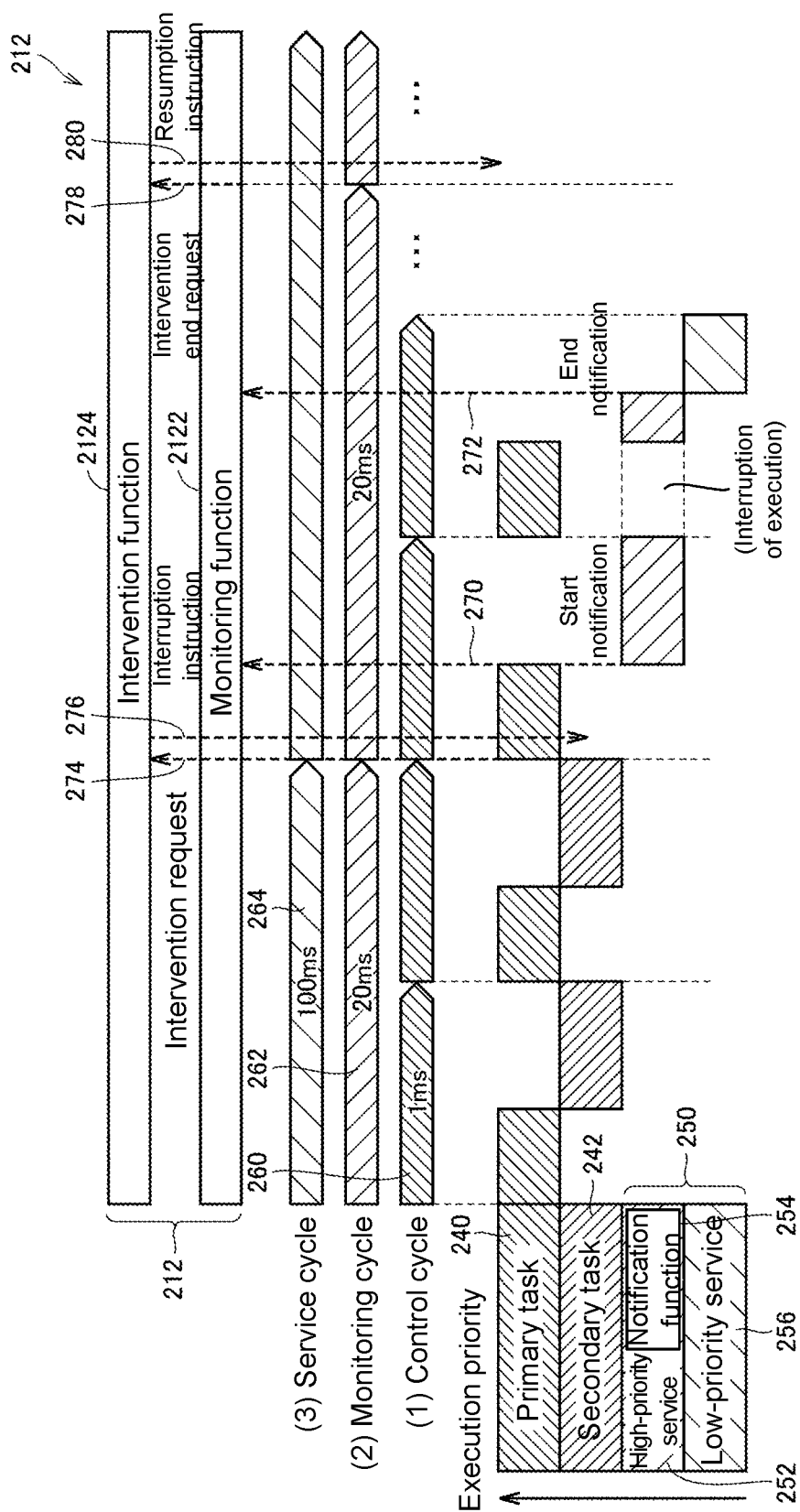
FIG. 7 is a diagram for explaining an intervention function in the computation unit according to the present embodiment.

FIG. 7 is a diagram for explaining the intervention function 2124 in the computation unit 13 according to the present embodiment. Referring to FIG. 7, the intervention function 2124 is provided in association with the monitoring function 2122. The monitoring function 2122 and the intervention function 2124 are implemented as a part of the scheduler program 212 or an additional function of the scheduler program 212.

The intervention function 2124 secures an execution time of the system service task 250 by intervening in other processes or services to limit execution time when the system service task 250 (the high-priority service 252 and the low-priority service 256) cannot be operated in a predetermined proportion of time. The intervention function 2124 receives an intervention request from the monitoring function 2122 and starts intervention in other processes or services.

The intervention function 2124 of the computation unit 13 according to the present embodiment intervenes in the operation of the secondary task 242 having a higher priority than the high-priority service 252 when the high-priority service 252 cannot operate in a predetermined proportion of time. In addition, the intervention function 2124 intervenes in the operation of the high-priority service 252 having a higher priority than the low-priority service 256 when the low-priority service 256 cannot operate in a predetermined proportion of time.

In this manner, when it is determined that a certain process or service is not appropriately executed, the intervention function 2124 intervenes in a process or service having a higher priority than the process or service.

Although an example of intervening in the operation of the secondary task 242 when the high-priority service 252 cannot be operated in the predetermined proportion of time will be mainly described below for convenience of description, it is possible to intervene in the operation of the high-priority service 252 when the low-priority service 256 cannot operate in a predetermined proportion of time.

FIG. 7 shows a case in which the execution time of the secondary task 242 is long and the high-priority service 252 cannot be executed as an example. In such an execution state, the monitoring function 2122 checks an execution state of the system service task 250 in each monitoring cycle 262 and, when it is determined that the system service task 250 cannot operate in a predetermined proportion of time, outputs an intervention request 274 to the intervention function 2124.

The intervention function 2124 receives the intervention request 274 from the monitoring function 2122 and outputs an interruption instruction 276 to the secondary task 242. Execution of the secondary task 242 is temporarily interrupted or is not substantially executed in the subsequent control cycle 260 according to the interruption instruction 276.

According to such interruption of execution of the secondary task 242, computing resources are allocated to the high-priority service 252 of the system service task 250. When execution of the system service task 250 is started, the notification function 254 of the system service task 250 outputs the start notification 270 to the monitoring function 2122. Thereafter, when execution of the system service task 250 ends, the notification function 254 of the system service task 250 outputs the end notification 272 to the monitoring function 2122. In addition, computing resources are also allocated to the low-priority service 256 according to interruption of execution of the secondary task 242.

Thereafter, the monitoring function 2122 checks the execution state of the system service task 250 at a timing when the current monitoring cycle 262 ends. Since execution of the secondary task 242 is interrupted such that each process included in the system service task 250 is executed previously, it is determined that the system service task 250 can operate in a predetermined proportion of time. Then, the monitoring function 2122 outputs an intervention end request 278 to the intervention function 2124.

The intervention function 2124 receives the intervention end request 278 from the monitoring function 2122 and outputs a resumption instruction 280 for the secondary task 242. Execution of the secondary task 242 is resumed according to the resumption instruction 280. That is, the secondary task 242 is executed in the same manner as being executed before the interruption instruction 276 is output from the intervention function 2124.

In this manner, in a state in which the secondary task 242 having a higher priority than the high-priority service 252 is executed, the intervention function 2124 may temporarily interrupt execution of a program included in the secondary task 242 when the execution state of the high-priority service 252 does not satisfy predetermined settings.

In addition, when the monitoring function 2122 monitors the execution state of the low-priority service 256, the intervention function 2124 may temporarily interrupt execution of a program included in the high-priority service 252 when the execution state of the low-priority service 256 does not satisfy predetermined settings.

Meanwhile, interruption of execution of the secondary task 242 according to the interruption instruction 276 may be realized by the scheduler program 212 interrupting allocation of computing resources to the secondary task 242 or realized by notifying the scheduler program 212 of completion of processing, by the secondary task 242 itself, without executing substantial processing at each execution timing.

It is possible to secure computing resources for the system service task 250 by temporarily changing allocation of computing resources by using the aforementioned intervention function 2124 even when a large amount of computing resources are allocated to the control process (the primary task 240 and the secondary task 242) and the system service task 250 (the high-priority service 252 and the low-priority service 256) cannot operate in a predetermined proportion of time.

Figure 8:
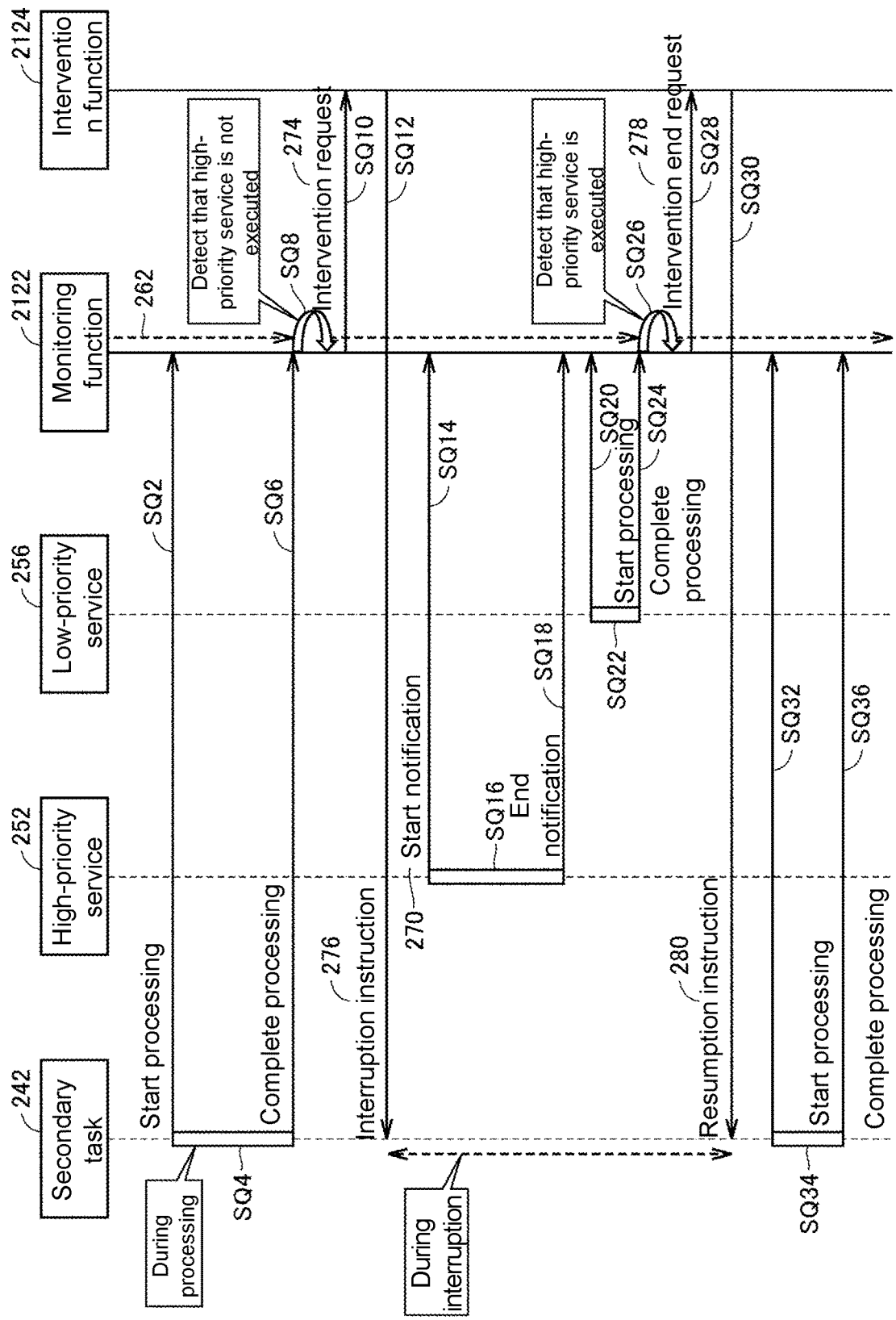
FIG. 8 is a sequence diagram for explaining a computing resource allocation management function for a system service according to the present embodiment.

FIG. 8 is a sequence diagram for explaining a computing resource allocation management function for a system service according to the present embodiment. The sequence diagram shown in FIG. 8 is illustrated to correspond to the time chart shown in FIG. 7. For convenience of description, FIG. 8 does not illustrate the primary task 240.

Referring to FIG. 8, the secondary task 242 notifies the scheduler program 212 (monitoring function 2122) of start of a process (sequence SQ2) and executes the process (sequence SQ4) when computing resources are allocated thereto. When execution of the process of the secondary task 242 is completed, the secondary task 242 notifies the scheduler program 212 (monitoring function 2122) of completion of the process (sequence SQ6).

When the current monitoring cycle 262 ends, the monitoring function 2122 calculates the processing time of the system service task 250 (the high-priority service 252 and the low-priority service 256) in the current monitoring cycle 262 before the next monitoring cycle 262 starts. When the monitoring function 2122 detects that the high-priority service 252 is not executed (sequence SQ8) on the basis of the calculated processing time of the system service task 250, the monitoring function 2122 outputs the intervention request 274 to the intervention function 2124 (sequence SQ10).

The intervention function 2124 receives the intervention request 274 from the monitoring function 2122 and outputs the interruption instruction 276 to the secondary task 242 (sequence SQ12). Execution of the secondary task 242 is temporarily interrupted according to the interruption instruction 276.

Then, computing resources are allocated to the high-priority service 252, and the high-priority service 252 (notification function 254) notifies the monitoring function 2122 of the start notification 270 (sequence SQ14) and executes the process (sequence SQ16). When execution of the process pertaining to the high-priority service 252 is completed, the high-priority service 252 (notification function 254) notifies the monitoring function 2122 of the end notification 272 (sequence SQ18).

In addition, when computing resources are allocated to the low-priority service 256, the low-priority service 256 notifies the scheduler program 212 (monitoring function 2122) of start of a process (sequence SQ20) and executes the process (sequence SQ22). When execution of the process of the low-priority service 256 is completed, the low-priority service 256 notifies the scheduler program 212 (monitoring function 2122) of completion of the process (sequence SQ24).

When the current monitoring cycle 262 ends, the monitoring function 2122 calculates the processing time of the system service task 250 (the high-priority service 252 and the low-priority service 256) in the current monitoring cycle 262 before the next monitoring cycle 262 starts. When the monitoring function 2122 detects that the high-priority service 252 is executed (sequence SQ26) on the basis of the calculated processing time of the system service task 250, the monitoring function 2122 outputs an intervention end request 278 to the intervention function 2124 (sequence SQ28).

Intervention function 2124 receives the intervention end request 278 from the monitoring function 2122 and outputs a resumption instruction 280 to the secondary task 242 (sequence SQ30). Execution of the secondary task 242 is recovered according to the resumption instruction 280.

Then, computing resources are allocated to the secondary task 242 and the secondary task 242 notifies the scheduler program 212 (monitoring function 2122) of start of a process (sequence SQ32) and executes the process (sequence SQ34). When execution of the process of the secondary task 242 is completed, the secondary task 242 notifies the scheduler program 212 (monitoring function 2122) of completion of the process (sequence SQ36). Hereinafter, the same process as the process shown in FIG. 8 is repeated.

G. Example of Operation of Computing Resource Allocation Management Function Next, an example of the operation of the computing resource allocation management function according to execution states of the control process (primary task 240 and the secondary task 242), the high-priority service 252 and the low-priority task 256 will be described. For convenience of description, the execution state described below shows an example executed by the single-core processor 100.

(g1. Case in which Start Notification 270 is not Output)

First, a case in which the start notification 270 is not output from the high-priority service 252 will be described. In a case in which the start notification 270 is not output from the high-priority service 252, it can be determined that computing resources are allocated to a control process for a process or a service having a higher priority.

Figure 9:
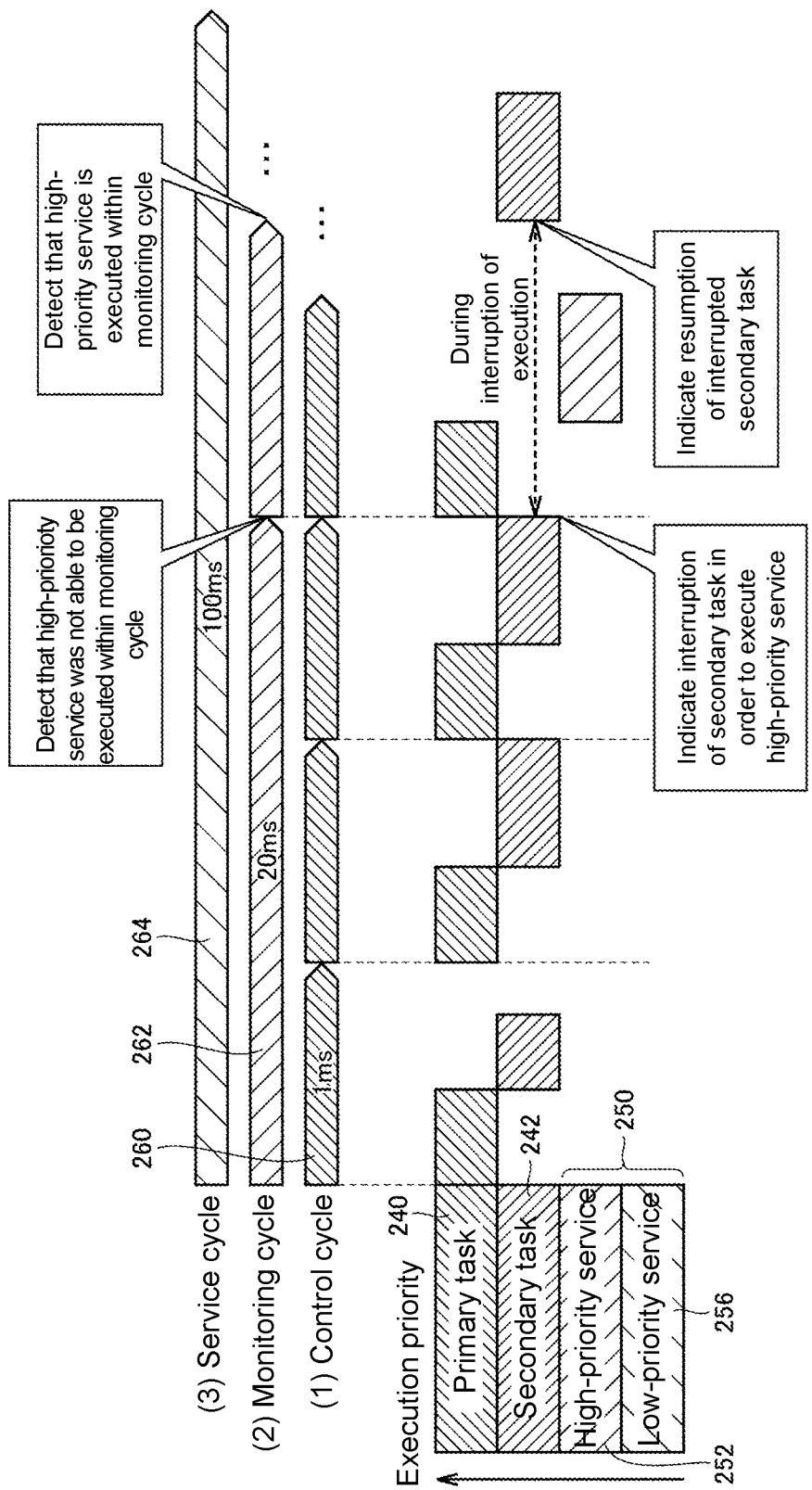
FIG. 9 is a diagram showing an example of an execution state in a case in which a primary task and a secondary task are set in the computation unit according to the present embodiment.

FIG. 9 is a diagram showing an example of an execution state in a case in which the primary task 240 and the secondary task 242 are set in the computation unit 13 according to the present embodiment. FIG. 9 shows an example in which the primary task 240, the secondary task 242 and the system service task 250 (the high-priority service 252 and the low-priority service 256) are assigned priorities in this order and executed.

When the start notification 270 is not output from the high-priority service 252 in the execution state shown in FIG. 9, it is detected that the high-priority service 252 was not be able to be executed within the monitoring cycle 262 at the end time of the monitoring cycle 262, interruption of execution is indicated for the secondary task 242 having a higher priority than the high-priority service 252 in order to execute the high-priority service 252.

In addition, when execution of the high-priority service 252 (and the low-priority service 256) is confirmed according to interruption of execution of the secondary task 242, resumption of execution of the interrupted secondary task 242 is indicated.

Figure 10:
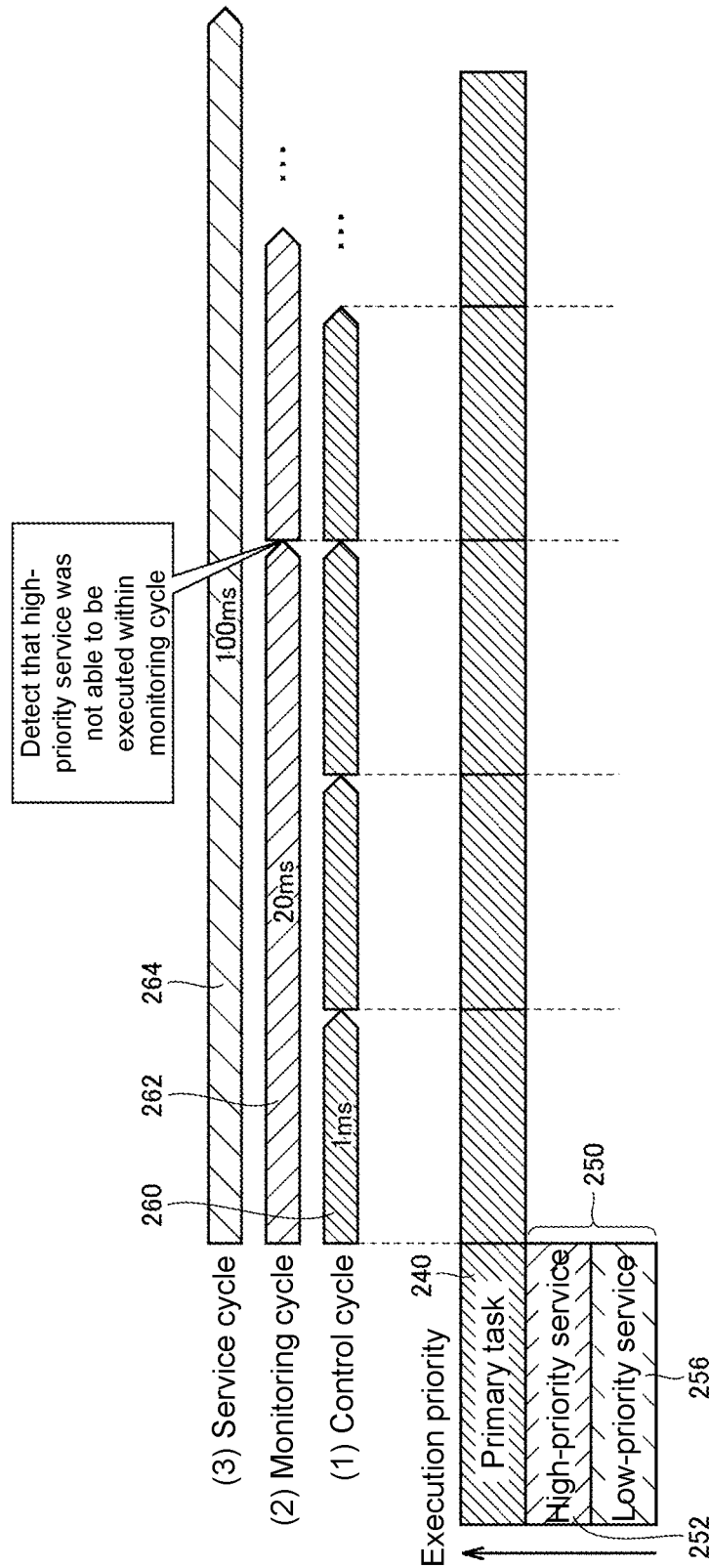
FIG. 10 is a diagram showing an example of an execution state in a case in which only a primary task is set in the computation unit according to the present embodiment.

FIG. 10 is a diagram showing an example of an execution state in a case in which only the primary task 240 is set in the computation unit 13 according to the present embodiment. FIG. 10 shows an example in which the primary task 240 and the system service task 250 (the high-priority service 252 and the low-priority service 256) are assigned priorities in this order and executed.

FIG. 10 shows an execution state in which a process set in the primary task 240 cannot end within the control cycle 260. In such an execution state, it is also detected that the high-priority service 252 was not be able to be executed within the monitoring cycle 262 at the end time of the monitoring cycle 262 because the start notification 270 is not output from the high-priority service 252. However, in this execution state, it is not possible to instruct the primary task 240 to interrupt execution.

The example of FIG. 10 shows an execution state in which the entire primary task 240 cannot be processed even using available computing resources within one control cycle 260. Accordingly, settings of the primary task 240 are reviewed basically.

Further, not only detection in each monitoring cycle 262 but also abnormality pertaining to basic time management of the scheduler program 212, such as task execution period excess, task execution timeout, IO refresh period excess and lack of system service time, are output, for example.

(g2. Case in which End Notification 272 is not Output)

Next, a case in which the start notification 270 is output from the high-priority service 252 but the end notification 272 is not subsequently output will be described. In a case in which the end notification 272 is not output from the high-priority service 252, it can be determined that processing of the high-priority service 252 continues (execution state continues).

Figure 11:
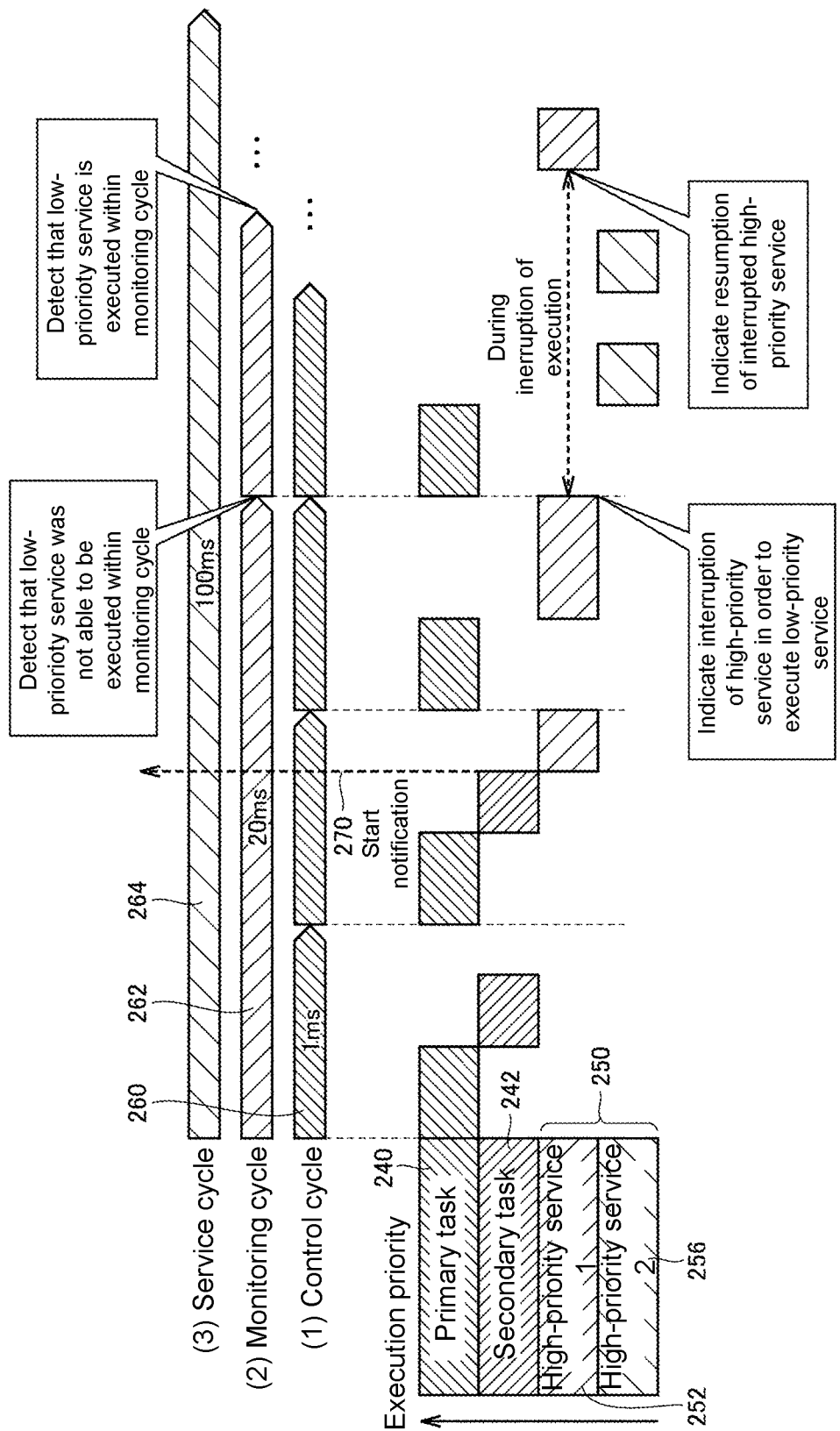
FIG. 11 is a diagram showing another example of an execution state in a case in which a primary task and a secondary task are set in the computation unit according to the present embodiment.

FIG. 11 is a diagram showing another example of an execution state in a case in which the primary task 240 and the secondary task 242 are set in the computation unit 13 according to the present embodiment. FIG. 11 shows an example in which the primary task 240, the secondary task 242 and the system service task 250 (the high-priority service 252 and the low-priority service 256) are assigned priorities in this order and executed.

When the start notification 270 is output from the high-priority service 252 and then the end notification 272 is not output in the execution state shown in FIG. 11, it is detected that execution of the high-priority service 252 continues at the end time of the monitoring cycle 262 and the low-priority service 256 was not be able to be executed within the monitoring cycle 262. In addition, interruption of execution is indicated for the high-priority service 252 having a higher priority than the low-priority service 256 in order to execute the low-priority service 256.

In addition, when execution of the low-priority service 256 is confirmed according to interruption of execution of the high-priority service 252, resumption of execution of the interrupted high-priority service 252 is indicated.

Although an example in which the system service task 250 includes two types of the high-priority service 252 and the low-priority service 256 has been exemplified in the above description, a plurality of high-priority services 252 may be included in the system service task 250. In this case, allocation of computing resources to each service is also managed.

Figure 12:
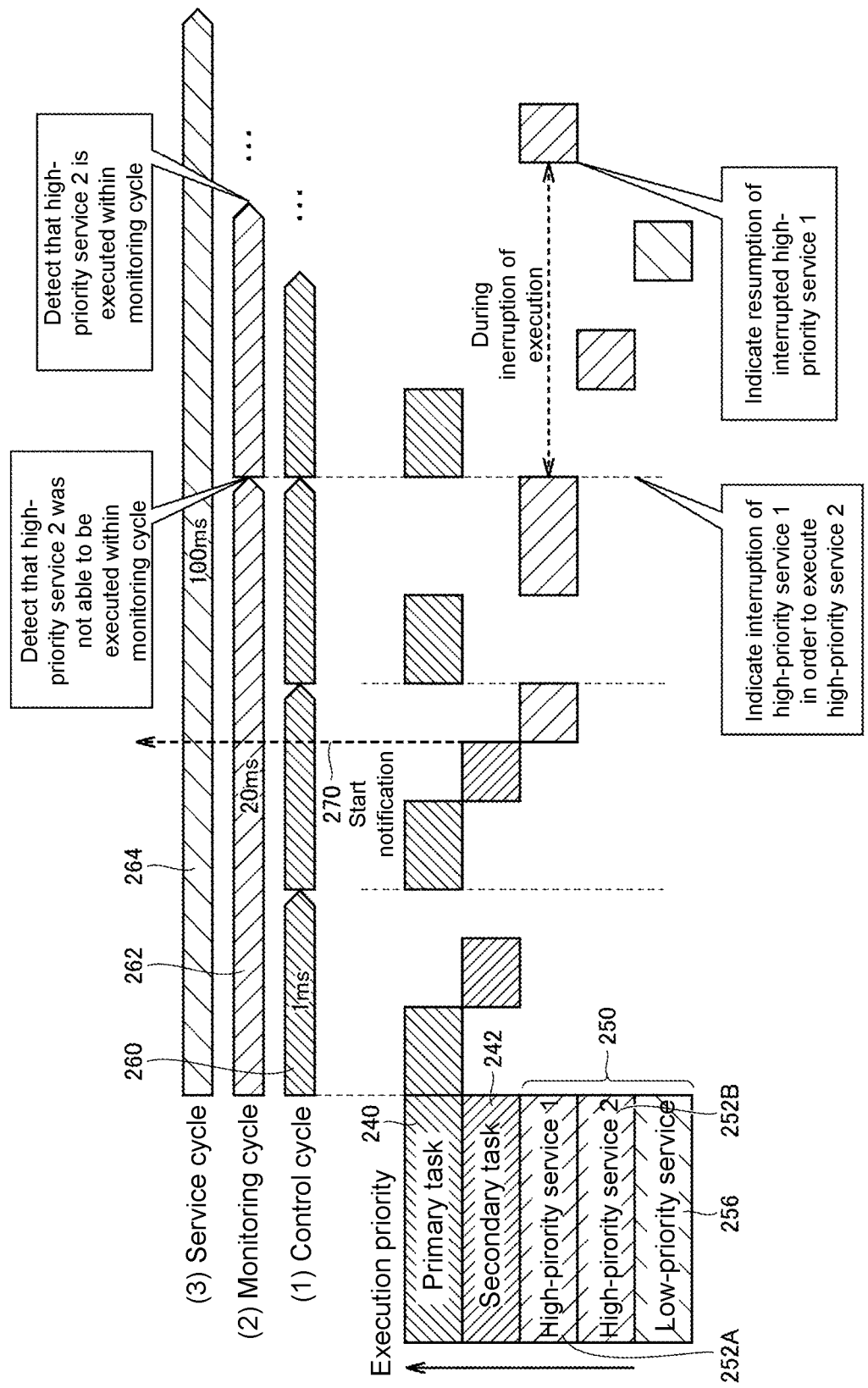
FIG. 12 is a diagram showing yet another example of an execution state in a case in which a primary task and a secondary task are set in the computation unit according to the present embodiment.

FIG. 12 is a diagram showing yet another example of an execution state in a case in which the primary task 240 and the secondary task 242 are set in the computation unit 13 according to the present embodiment. FIG. 12 shows an example in which the primary task 240, the secondary task 242 and the system service task 250 (a high-priority service 252A, a high-priority service 252B and the low-priority service 256) are assigned priorities in this order and executed.

When the start notification 270 is output from the high-priority service 252A and then the end notification 272 is not output in the execution state shown in FIG. 12, it is detected that execution of the high-priority service 252A continues at the end time of the monitoring cycle 262 and the high-priority service 252B was not be able to be executed within the monitoring cycle 262. In addition, interruption of execution is indicated for the high-priority service 252A in order to execute the high-priority service 252B.

In addition, when execution of the high-priority service 252B and the low-priority service 256 is confirmed according to interruption of execution of the high-priority service 252A, resumption of execution of the interrupted high-priority service 252A is indicated.

H. Modified Example

Although description focuses on an execution state (fixed time interval execution) in which the primary task 240 is repeatedly executed in each control cycle 260 in the above-described embodiment, the disclosure is also applicable to execution states (non-fixed time interval execution) in which the primary task 240 is repeatedly executed for each unspecified period.

Figure 13:
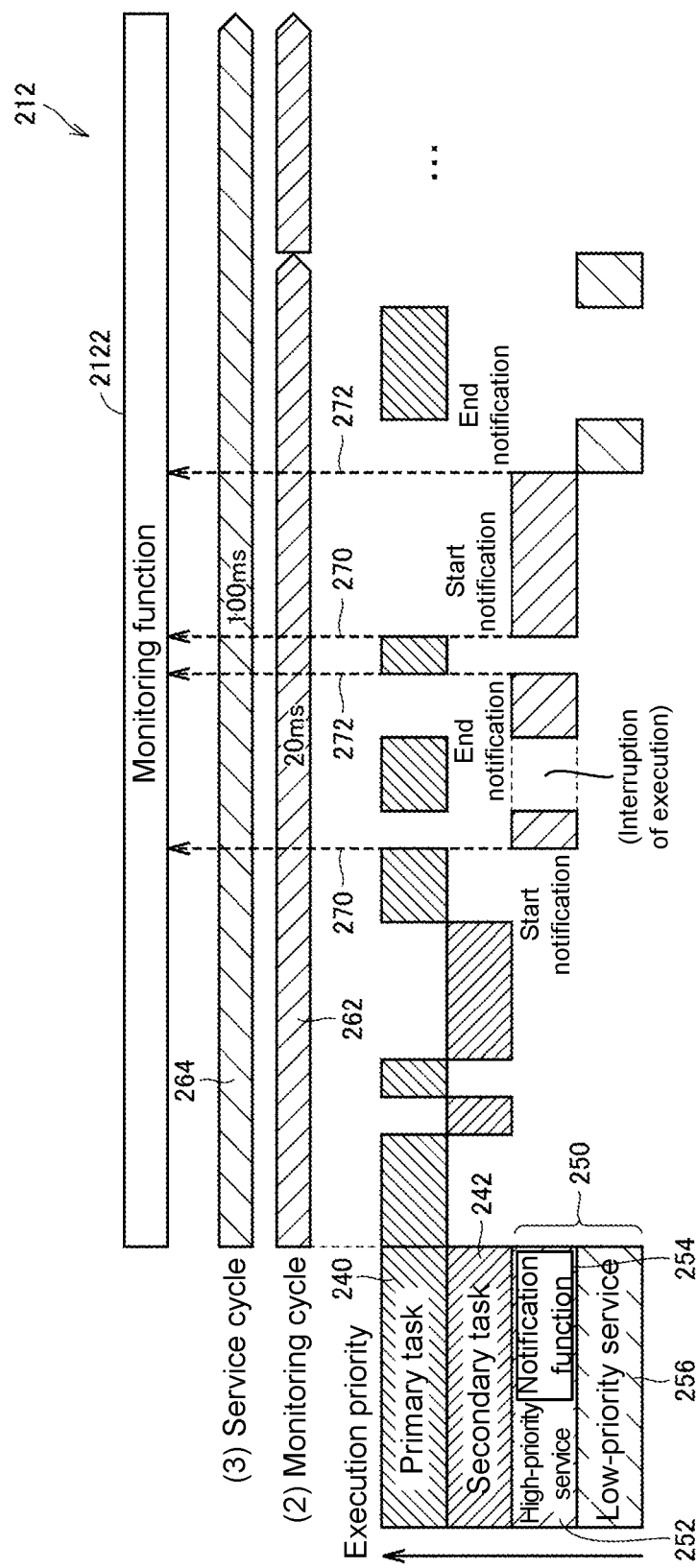
FIG. 13 is a diagram showing an example of an execution state in a case in which a primary task and a secondary task are not executed at fixed time intervals in the computation unit according to the present embodiment.

FIG. 13 is a diagram showing an example of an execution state in a case in which the primary task 240 and the secondary task 242 are not executed at fixed time intervals in the computation unit 13 according to the present embodiment. Referring to FIG. 13, the primary task 240 is repeatedly executed at a best-effort cycle depending on computing resources in the computation unit 13, and the like in non-fixed time interval execution. Accordingly, the duration of a time from completion of execution of the primary task 240 in a certain cycle to start of execution of the primary task 240 in the next cycle is variable rather than being fixed.

Even in such an execution state, the execution time of the system service task 250 can be calculated in each monitoring cycle 262 on the basis of a time from the start notification 270 to the end notification 272 from the high-priority service 252, and thus it is possible to manage allocation of appropriate computing resources to the system service task 250 through intervention in a process or a service using the intervention function 2124 from the calculated execution time.

I. Processing Procedure

Next, a processing procedure in the computation unit 13 according to the present embodiment will be described.

Figure 14:
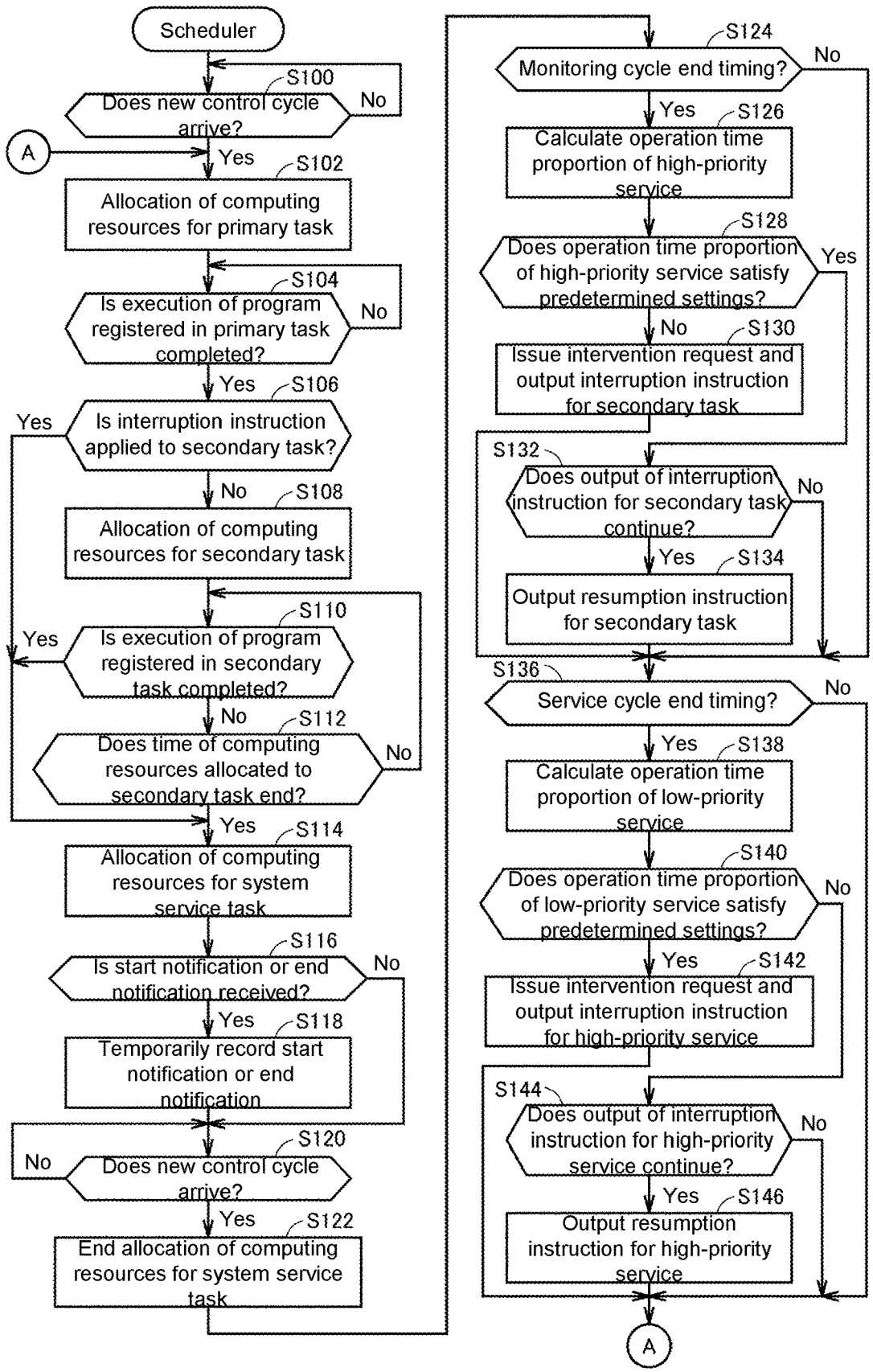
FIG. 14 is a flowchart showing a processing procedure in the computation unit according to the present embodiment.

FIG. 14 is a flowchart showing a processing procedure in the computation unit 13 according to the present embodiment. Each step shown in FIG. 14 is typically realized by the processor 100 of the computation unit 13 executing the system program 210 (refer to FIG. 4). Particularly, the processes shown in FIG. 14 are realized by a command code group included in the scheduler program 212 (refer to FIG. 4). Accordingly, in FIG. 14, each process is described using a scheduler realized by execution of the scheduler program 212 as an execution subject.

Referring to FIG. 14, when a new control cycle arrives (YES in step S100), the scheduler allocates computing resources to the primary task 240 (step S102). When execution of a program registered in the primary task 240 is completed (YES in step S104), the scheduler determines whether the interruption instruction 276 is applied to the secondary task 242 (step 106).

If the interruption instruction 276 is not applied to the secondary task 242 (NO in step 106), the scheduler allocates computing resources to the secondary task 242 (step S108).

If the interruption instruction 276 is applied to the secondary task 242 (YES in step 106), when execution of a program registered in the secondary task 242 is completed (YES in step S110) or a time of the computing resources allocated to the secondary task 242 ends (YES in step S112), the scheduler allocates computing resources to the system service task 250 (step S114). In addition, when the scheduler receives the start notification 270 or the end notification 272 (YES in step S116), the scheduler temporarily records the received start notification 270 or end notification 272 (step S118).

When a new control cycle arrives (YES in step S120), the scheduler ends allocation of computing resources to the system service task 250 (step S122).

Here, if the end timing of the immediately previous control cycle is the end timing of the monitoring cycle 262 (YES in step S124), the scheduler calculates an operation time proportion of the high-priority service 252 in the monitoring cycle 262 on the basis of the received start notification 270 and the end notification 272 (step S126).

If the calculated operation time proportion of the high-priority service 252 in the monitoring cycle 262 does not satisfy predetermined settings (NO in step S128), the scheduler issues the intervention request 274 and outputs the interruption instruction 276 to the secondary task 242 (step S130).

If the calculated operation time proportion of the high-priority service 252 in the monitoring cycle 262 satisfies the predetermined settings (YES in step S128) and output of the interruption instruction 276 to the secondary task 242 continues (YES in step S132), the scheduler outputs the resumption instruction 280 to the secondary task 242 (step S134).

In addition, if the end timing of the immediately previous control cycle is the end timing of a control cycle immediately prior to the service cycle 264 (YES in step S136), the scheduler calculates an operation time proportion of the low-priority service 256 in the service cycle 264 on the basis of the received start notification 270 and the end notification 272 (step S138).

If the calculated operation time proportion of the low-priority service 256 in the service cycle 264 does not satisfy predetermined settings (NO in step S140), the scheduler issues the intervention request 274 and outputs the interruption instruction 276 to the high-priority service 252 (step S142).

If the calculated operation time proportion of the low-priority service 256 in the service cycle 264 satisfies the predetermined settings (YES in step S140) and output of the interruption instruction 276 to the high-priority service 252 continues (YES in step S144), the scheduler outputs the resumption instruction 280 to the high-priority service 252 (step S146).

Hereinafter, processes following step S102 are repeated in the same manner.

J. Supplement

The above-described present embodiment includes the following technical ideas.

[Configuration 1]

A control apparatus 1 for controlling a control object, including:

a processor 100;

a first program 240 which is repeatedly executed by the processor and has a highest execution priority;

a second program 252 having a lower execution priority than the first program;

a third program 256 having a lower execution priority than the second program; and a scheduler program 212 which manages programs executed by the processor, wherein the second program includes a notification command (notification function program 224) for outputting a start notification 270 according to start of execution in the processor and outputting an end notification 272 according to completion of execution in the processor, and the scheduler program 212 includes a command 2120 for causing the processor to execute the second and third programs such that execution of the first program is not obstructed, and a command 2122 for determining an execution state of the second program in each predetermined monitoring cycle 262 on the basis of the start notification and the end notification from the second program.

[Configuration 2]

The control apparatus described in configuration 1, further including a fourth program 242 having a higher execution priority than the second program, wherein the scheduler program includes a command 2124 for temporarily interrupting execution of the fourth program when the execution state of the second program does not satisfy predetermined settings.

[Configuration 3]

The control apparatus described in configuration 1 or 2, wherein the command for determining the execution state includes a command for determining an execution state of the third program in the monitoring cycle, and the scheduler program includes a command 2124 for temporarily interrupting execution of the second program when the execution state of the third program does not satisfy predetermined settings.

[Configuration 4]

The control apparatus described in any of configurations 1 to 3, wherein the notification command is integrated into the second program using an application programming interface (API).

[Configuration 5]

The control apparatus described in any of configurations 1 to 4, wherein the scheduler program repeatedly executes the first program in each predetermined control cycle 260.

[Configuration 6]

The control apparatus described in configuration 5, wherein the scheduler program executes the second program and the third program in idle time in which the first program is not executed.

[Configuration 7]

The control apparatus described in any of configurations 1 to 6, wherein the command for determining the execution state includes a command for calculating a proportion of the operation time of the second program in the monitoring cycle.

[Configuration 8]

The control apparatus described in configuration 7, wherein the command for determining the execution state further includes a command for calculating a proportion of the operation time of the third program in a second monitoring cycle 264 longer than the monitoring cycle.

[Configuration 9]

A system program 210 executed in a control apparatus 1 having a processor 100 for controlling a control object, wherein the control apparatus includes a first program 240 which is repeatedly executed by the processor and has a highest execution priority, a second program 252 having a lower execution priority than the first program, and a third program 256 having a lower execution priority than the second program, wherein the second program includes notification commands (notification function program 224) for outputting a start notification 270 according to start of execution in the processor and outputting an end notification 272 according to completion of execution in the processor, and the system program includes a scheduler program 212 which manages programs executed by the processor, wherein the scheduler program includes a command 2120 for causing the processor to execute the second and third programs such that execution of the first program is not obstructed, and a command 2122 for determining an execution state of the second program in each predetermined monitoring cycle 262 on the basis of the start notification and the end notification from the second program.

[Configuration 10]

A control method of a control apparatus 1 having a processor 100 for controlling a control object, wherein the control apparatus includes a first program 240 which is repeatedly executed by the processor and has a highest execution priority, a second program 252 having a lower execution priority than the first program and a third program 256 having a lower execution priority than the second program, wherein the second program includes a notification command (notification function program 224) for outputting a start notification 270 according to start of execution in the processor and outputting an end notification 272 according to completion of execution in the processor, the control method including:

a step S108 and S114 of causing the processor to execute the second and third programs such that execution of the first program is not obstructed; and a step S126 of determining an execution state of the second program in each predetermined monitoring cycle on the basis of the start notification and the end notification from the second program.

K. Advantages

According to the present embodiment, it is possible to check an execution state of a program with respect to the system service task 250 as well as the control process (the primary task 240 and the secondary task 242) whose execution time is managed. More specifically, it is possible to monitor an execution state in each predetermined monitoring cycle 262 with respect to the high-priority service 252 included in the system service task 250 and monitor how much computing resources are allocated to the high-priority service 252 within the monitoring cycle 262.

Further, when it is determined that allocation of computing resources to the high-priority service 252 is not sufficient, a system in which computing resources are preferentially allocated to the high-priority service 252 is provided.

By employing such a configuration, it is possible to realize allocation of appropriate computing resources to the high-priority service 252 included in the system service task 250 according to situation without manually adjusting, by a user, allocation of computing resources to the control process (the primary task 240 and the secondary task 242).

For example, it is possible to satisfy a computing resource allocation request (e.g., one-time operation per 100 ms) for the low-priority service 256 in addition to a computing resource allocation request (e.g., operation per 20 ms) for the high-priority service 252 included in the system service task 250 by using the computing resource allocation function according to the present embodiment.

In addition, even when a single-core processor is employed, it is possible to appropriately execute both the control process (primary task 240 and the secondary task 242) and the system service task 250 by efficiently using computing resources provided by the processor by employing the computing resource allocation function according to the present embodiment. Further, when a multi-core processor or a plurality of processors are used, it is possible to realize efficient allocation of computing resources even when a larger number of programs are registered in the system service task 250.

The embodiments disclosed herein are to be construed in all aspects as illustrative and not restrictive. The scope of the present disclosure should be determined by the appended claims and their legal equivalents, not by the above description, and all changes coming within the meaning and equivalency range of the appended claims are intended to be embraced therein.

What is claimed is:

1. A control apparatus for controlling a control object, comprising:
   a processor, configured to execute a plurality of programs, wherein the plurality of programs executed by the processor is managed by a scheduler program and the plurality of programs comprises a first program, a second program, a third program, a fourth program wherein
   the first program which is repeatedly executed by the processor and has a highest execution priority;
   the second program having a lower execution priority than the first program;
   the third program having a lower execution priority than the second program;
   the fourth program having a higher execution priority than the second program; and
   the scheduler program which manages programs executed by the processor,
   wherein the second and third programs include a notification command for outputting a start notification according to start of execution in the processor and outputting an end notification according to completion of execution in the processor,
   the scheduler program executes a command for causing the processor to execute the second and third programs such that execution of the first program is not obstructed, and a command for determining an execution state of the second and third programs in each predetermined monitoring cycle on the basis of the start notification and the end notification from the second and third programs,
   determining that the second and the third program requires a larger amount of computing resources and an execution state of the second program and of the third program does not satisfy a predetermined setting corresponding to the second program and the third program, and
   the scheduler program executes a command for interrupting execution of the fourth program in response to having determined that the second and the third program requires the larger amount of computing resources and the execution state of the second program and of the third program does not satisfy the predetermined setting corresponding to the second program and the third program.

2. The control apparatus according to claim 1, wherein the notification command is integrated into the second program using an application programming interface (API).

3. The control apparatus according to claim 2, wherein the command for determining the execution state includes a command for calculating a proportion of an operation time of the second program in the predetermined monitoring cycle.

4. The control apparatus according to claim 3, wherein the command for determining the execution state further includes a command for calculating a proportion of an operation time of the third program in a second monitoring cycle longer than the predetermined monitoring cycle.

5. The control apparatus according to claim 1, wherein the scheduler program repeatedly executes the first program in each predetermined control cycle.

6. The control apparatus according to claim 5, wherein the scheduler program executes the second program and the third program in idle time in which the first program is not executed.

7. The control apparatus according to claim 6, wherein the command for determining the execution state includes a command for calculating a proportion of an operation time of the second program in the predetermined monitoring cycle.

8. The control apparatus according to claim 7, wherein the command for determining the execution state further includes a command for calculating a proportion of an operation time of the third program in a second monitoring cycle longer than the predetermined monitoring cycle.

9. The control apparatus according to claim 1, wherein the command for determining the execution state includes a command for calculating a proportion of an operation time of the second program in the predetermined monitoring cycle.

10. The control apparatus according to claim 9, wherein the command for determining the execution state further includes a command for calculating a proportion of an operation time of the third program in a second monitoring cycle longer than the predetermined monitoring cycle.

11. The control apparatus according to claim 1, wherein the command for determining the execution state includes a command for calculating a proportion of an operation time of the second program in the predetermined monitoring cycle.

12. The control apparatus according to claim 11, wherein the command for determining the execution state further includes a command for calculating a proportion of an operation time of the third program in a second monitoring cycle longer than the predetermined monitoring cycle.

13. A non-transitory storage medium storing a system program executed in a control apparatus having a processor for controlling a control object,
- wherein the system program includes a first program which is repeatedly executed by the processor and has a highest execution priority, a second program having a lower execution priority than the first program, and a third program having a lower execution priority than the second program, the fourth program having a higher execution priority than the second program,
- the second and third programs include a notification command for outputting a start notification according to start of execution in the processor and outputting an end notification according to completion of execution in the processor, and the system program includes a scheduler program which manages programs executed by the processor,
- the scheduler program executes a command for causing the processor to execute the second and third programs such that execution of the first program is not obstructed, and a command for determining an execution state of the second and third programs in each predetermined monitoring cycle on the basis of the start notification and the end notification from the second and third programs,
- the second and the third program is determined to require a larger amount of computing resources and an execution state of the second program and of the third program does not satisfy a predetermined setting corresponding to the second program and the third program, and
- the scheduler program executes a command for interrupting execution of the fourth program in response to having determined that the second and the third program requires the larger amount of computing resources and the execution state of the second program and of the third program does not satisfy the predetermined setting corresponding to the second program and the third program.

14. A control method of a control apparatus having a processor for controlling a control object,
- wherein the processor is configured to execute a plurality of programs, wherein the plurality of programs comprises a first program, a second program, a third program, a fourth program, wherein the first program is repeatedly executed by the processor and has a highest execution priority, the second program having a lower execution priority than the first program, the third program having a lower execution priority than the second program and the fourth program having a higher execution priority than the second program,
- wherein the second and third programs include a notification command for outputting a start notification according to start of execution in the processor and outputting an end notification according to completion of execution in the processor, the control method comprising:
- a step of causing the processor to execute the second and third programs such that execution of the first program is not obstructed;
- a step of determining an execution state of the second and third programs in each predetermined monitoring cycle on the basis of the start notification and the end notification from the second and third programs;
- a step of determining that the second and the third program requires a larger amount of computing resources and an execution state of the second program and of the third program does not satisfy a predetermined setting corresponding to the second program and the third program; and
- a step of interrupting execution of the fourth program in response to having determined that the second and the third program requires the larger amount of computing resources and the execution state of the second program and of the third program does not satisfy the predetermined setting corresponding to the second program and the third program.

* * * * *